United States Patent [19]

DeWoolfson et al.

[11] Patent Number: 5,630,493
[45] Date of Patent: May 20, 1997

[54] ACCEPTANCE ASSEMBLY FOR A REVERSE VENDING MACHINE

[75] Inventors: Bruce H. DeWoolfson; Ken R. Powell; David Alexander, all of Fairfax, Va.

[73] Assignee: Environmental Products Corporation, Fairfax, Va.

[21] Appl. No.: 321,864

[22] Filed: Oct. 17, 1994

Related U.S. Application Data

[63] Continuation-in-part of Ser. No. 132,233, Oct. 6, 1993, Pat. No. 5,355,987, which is a continuation of Ser. No. 851,494, Mar. 16, 1992, abandoned.

[51] Int. Cl.⁶ ............................................. G07F 7/06
[52] U.S. Cl. ............................................. 194/209
[58] Field of Search ........................... 194/205, 208, 194/209, 212, 213; 222/502, 503

[56] References Cited

U.S. PATENT DOCUMENTS

| | | | |
|---|---|---|---|
| 4,141,493 | 2/1979 | Arp | 209/567 |
| 4,179,018 | 12/1979 | Miller | 209/631 |
| 4,248,334 | 2/1981 | Hanley et al. | |
| 4,285,426 | 8/1981 | Cahill | 100/902 |
| 4,324,325 | 4/1982 | DeWoolfson | 100/902 |
| 4,342,385 | 8/1982 | Kaspar | |
| 4,345,679 | 8/1982 | DeWoolfson | 100/902 |
| 4,402,391 | 9/1983 | Tuten et al. | 177/165 |
| 4,412,608 | 11/1983 | Kaspar et al. | |
| 4,440,284 | 4/1984 | DeWoolfson | 209/930 |
| 4,443,697 | 4/1984 | Ryan et al. | 100/902 |
| 4,463,844 | 8/1984 | Huffman et al. | 209/219 |
| 4,469,212 | 9/1984 | DeWoolfson | 100/53 |
| 4,480,737 | 11/1984 | Jamgochian et al. | 209/631 X |
| 4,492,295 | 1/1985 | DeWoolfson | 100/902 X |
| 4,512,253 | 4/1985 | La Barge et al. | 100/902 |
| 4,532,859 | 8/1985 | Solordal | 100/902 |
| 4,558,775 | 12/1985 | LaBarge et al. | 100/902 |
| 4,566,585 | 1/1986 | Dreher et al. | 198/624 |
| 4,573,641 | 3/1986 | DeWoolfson et al. | 194/205 X |
| 4,576,289 | 3/1986 | Jarrett et al. | 209/631 |
| 4,579,216 | 4/1986 | DeWoolfson et al. | 194/212 |
| 4,597,487 | 7/1986 | Crosby et al. | 194/209 |
| 4,653,627 | 3/1987 | Hampson et al. | 194/209 |
| 4,687,144 | 8/1987 | Irwin et al. | 241/49 |
| 4,717,026 | 1/1988 | Fischer et al. | 194/205 |
| 4,784,251 | 11/1988 | DeWoolfson et al. | 194/209 |
| 4,787,495 | 11/1988 | Tuten et al. | 194/209 |
| 4,809,915 | 3/1989 | Koffsky et al. | 241/36 |
| 4,919,274 | 4/1990 | Hammond | 194/208 X |
| 4,919,534 | 4/1990 | Reed | 209/582 X |
| 4,923,126 | 5/1990 | Lodovico et al. | 241/30 |
| 4,953,682 | 9/1990 | Helbawl | 194/208 |
| 5,042,634 | 8/1991 | Gulmini | 194/209 |
| 5,068,835 | 11/1991 | Reed | 209/524 X |
| 5,106,026 | 4/1992 | Baron | 241/99 |
| 5,152,387 | 10/1992 | Hammond | 194/208 |
| 5,161,661 | 11/1992 | Hammond | 194/209 |
| 5,340,269 | 8/1994 | Caridis et al. | 414/786 |
| 5,355,987 | 10/1994 | DeWoolfson et al. | 194/209 |

FOREIGN PATENT DOCUMENTS

| | | |
|---|---|---|
| 3141478 | 5/1983 | Germany . |
| 3502-465-A | 7/1986 | Germany . |

OTHER PUBLICATIONS

Hamilton, M. M., "Turning Cans Into Cold Cash," The Washington Post, Jul. 2, 1991.

*Primary Examiner*—F. J. Bartuska
*Attorney, Agent, or Firm*—Finnegan, Henderson, Farabow, Garrett & Dunner, L.L.P.

[57] ABSTRACT

An acceptance assembly for a commodity collection, densification, and storage device includes a frame, an insert tube disposed in the frame defining an inlet for receiving a commodity and an outlet, a sensor disposed in the frame proximate the outlet for sensing a feature of the commodity, and an iris device disposed in the frame between the outlet and the sensor. The iris device includes a base secured to the frame and defining an opening therethrough adjacent the outlet, and further includes three plates swingably secured to the base, the plates being pivotable between a first position covering the opening and the outlet, and a second position uncovering the opening and the outlet. The iris device precludes access to the sensor via the inlet of the insert tube when the iris device is in the first position.

19 Claims, 17 Drawing Sheets

ACCEPTANCE ASSEMBLY FOR A REVERSE VENDING MACHINE

BACKGROUND OF THE INVENTION

This application is a continuation-in-part of U.S. Pat. Ser. No. 132,233, filed Oct. 6, 1993 now U.S. Pat. No. 5,355,987, which is a continuation of U.S. patent application Ser. No. 07/851,494, filed Mar. 16, 1992, now abandoned, both of which are incorporated by reference herein.

FIELD OF THE INVENTION

This invention relates to the collection, densification and storage of recyclable commodities, and more particularly to a machine for collecting, densifying and storing a plurality of different types of recyclable commodities and which can process and store each of the densified commodities separately. More particularly, it relates to an acceptance assembly for a reverse vending machine which can safeguard interior portions of the machine and prevent injury to consumers.

DESCRIPTION OF THE PRIOR ART

With the increasing emphasis in recent years on environmental protection, the recycling of used beverage containers and other similar commodities has become an important factor in the conservation effort. More specifically, the recycling of aluminum, glass and plastic containers has proven to be environmentally beneficial.

On the other hand, non-returnable containers for beverages and other goods are widely used because their cost has been less than the cost of recycling and/or cleaning reusable deposit containers and bottles. One significant effect of the widespread use of non-deposit containers has been increased litter in public places, and overflow of garbage dumps and landfills.

To combat litter and increase the amount of material that is recycled, several states have enacted mandatory "deposit laws" that require the use of containers having an added deposit cost. When the customer purchases a product in such a container, a container deposit, typically five to ten cents, is added to the purchase price. After consumption of the product, the consumer can obtain a refund of the deposit by returning the empty container, often to the retailer, for recycling. The amount of the deposit may be adjusted to create an incentive for returning the container that is greater than the inconvenience in doing so. In these states, retailers generally collect the used containers and sell them to distributors or others who pay the retailer for the scrap value of the containers plus an amount to cover the retailer's handling costs.

Since the high labor cost of processing recycled material often makes recycling uneconomic, especially for retailers, various automatic machines that accept material for recycling and issue deposit refunds have been proposed. These machines relieve the burdens on the grocery industry and those who must collect the containers, pay the refunds, and store the returned commodities. For example, Applicants' Assignee is the owner of U.S. Pat. Nos. 4,324,325, 4,345, 679, 4,440,284, 4,469,212, 4,492,295, 4,573,641, 4,579,216, 4,784,251 and 5,226,519. All of these patents relate to machines and systems for automated redemption of beverage containers.

Another approach to improving the economics of recycling is to increase the scrap value of the recycled material. One method for increasing the scrap value is to segregate the returned material into groups whose scrap price is inherently higher than the scrap price of unsegregated material. Separation of scrap by composition (for example, glass and plastic) or by color (for example, clear glass and green glass) greatly increases the value of the scrap material. Separation of plastic scrap further according to chemical make-up is also desirable with vinyl-based container scrap being excluded from mixture with high density polyethylene, polypropylene, and polyethylene terephthalate (PET) container scrap.

In the past, segregation of returned containers has been labor intensive, so that the labor to perform the sorting can sometimes cost more than the increase in resale value of the segregated material.

U.S. Pat. No. 5,226,519 discloses a device for receiving various different types of commodities and maintaining separation of each type. However, this device includes a plurality of collection stations for receiving a plurality of commodities through a plurality of insert ports, each port for receiving one different predetermined type of commodity. The device requires the consumer to first insert all containers of one type (for example, cans) into one collection station, and receive a payment for those containers. Next, the consumer inserts containers of another type in another collection station for a separate payment. A consumer having three types of containers to recycle must therefore stand in three separate lines at three separate collection stations and receive three separate payments. Further, the multiple stations require the retailer to provide a large amount of space to house the devices.

Prior recycling machines have also been cumbersome to use because many machines require the consumer to place individual containers into the machine by hand one at a time. Therefore, a safety device was required to prevent the consumer from being injured by the machine. Prior devices have included a safety door which must be closed by the consumer after inserting a container in order for the machine to accept the container and begin operation. Thus, the consumer had to insert a container, close the door, wait for the machine to operate, open the door, insert another container, close the door, etc., in order to recycle a number of containers. Further, as noted above, keeping the recycled materials separate once accepted by the machine required the consumer to walk from machine to machine, inserting a different type of container in each machine.

SUMMARY OF THE INVENTION

Accordingly, it is an object of the present invention to efficiently collect, densify and store large quantities of recyclable commodities, and to overcome the deficiencies of the prior art devices discussed above.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an acceptance assembly for a commodity collection, densification, and storage device including a frame, an insert tube disposed in the frame defining an inlet for receiving a commodity and an outlet, a sensor disposed in the frame proximate the outlet for sensing a feature of the commodity, and an iris device disposed in the frame between the outlet and the sensor, the iris device having a base secured to the frame and defining an opening therethrough adjacent the outlet, and three plates swingably secured to the base, the plates being pivotable between a first position covering the opening and the outlet, and a second position uncovering the opening and the outlet, the iris device precluding access to the sensor via the inlet of the insert tube when the iris device is in the first position.

Preferably, the acceptance assembly includes means for drawing the commodity through the insert tube including a driven roller supported by the frame and disposed in the insert tube rotatable in a direction to draw the commodity from the inlet through the outlet.

Preferably, the acceptance assembly also includes a separation mechanism disposed in the frame for separating the commodity according to the sensed feature. The separation mechanism preferably includes a main axle, two end plates, and a plurality of dividers disposed between the end plates and extending substantially radially from the main axle, a pair of adjacent dividers defining a cradle therebetween, the end plates and dividers rotatably mounted as a unit to the main axle and rotating about the main axle to thereby place one of the cradles in position to receive the commodity after exiting the outlet.

The invention also includes a method of accepting a commodity into a commodity collection, densification, and storage device having a frame, the method comprising the steps of inserting the commodity into an inlet of an insert tube disposed in the frame toward an outlet of the insert tube, moving an iris device from a first position to a second position, the iris device including a base secured to the frame and defining an opening therethrough adjacent the outlet, and three plates swingably secured to the base, the plates being pivotable between the first position covering the opening and the outlet, and the second position uncovering the opening and the outlet, the iris device precluding access to the sensor via the inlet of the insert tube when the iris device is in the first position, returning the door to the first position, and sensing a feature of the commodity with a sensor disposed in the frame proximate the outlet.

It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification illustrate a preferred embodiment of the invention. Together with the description, they serve to explain the objects, advantages and principles of the invention. In the drawings.

DESCRIPTION OF THE PREFERRED EMBODIMENTS

Reference will now be made in detail to the present preferred embodiments of the invention, as illustrated in the accompanying drawings.

In accordance with the present invention, a commodity collection, densification and storage assembly includes a housing and storage means for storing densified commodities according to composition. As broadly depicted in FIG. 1, each commodity collection, densification and storage assembly includes a housing 11, and a storage means 12. Storage means 12, as broadly claimed herein, may comprise, for example, a plurality of storage bins 13, 14 and 15 for storing densified commodities separately according to the composition of the commodity. A consumer may insert a plurality of recyclable commodities of different compositions into the housing 11.

Figure 1:
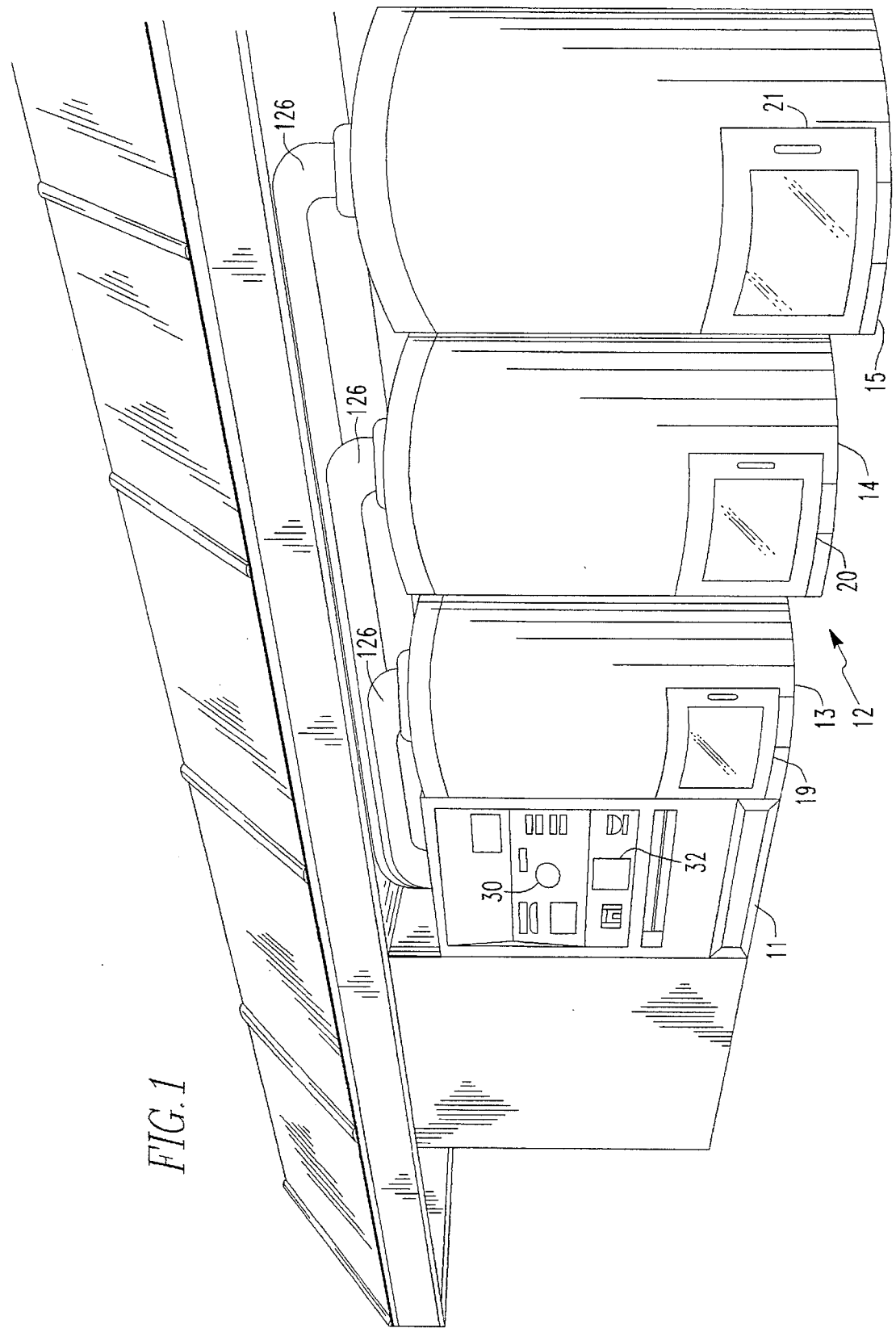
FIG. 1 is a perspective view of an embodiment of the commodity collection, densification and storage assembly of the present invention showing separate storage means for storing the densified commodity according to its composition.
Figure 2:
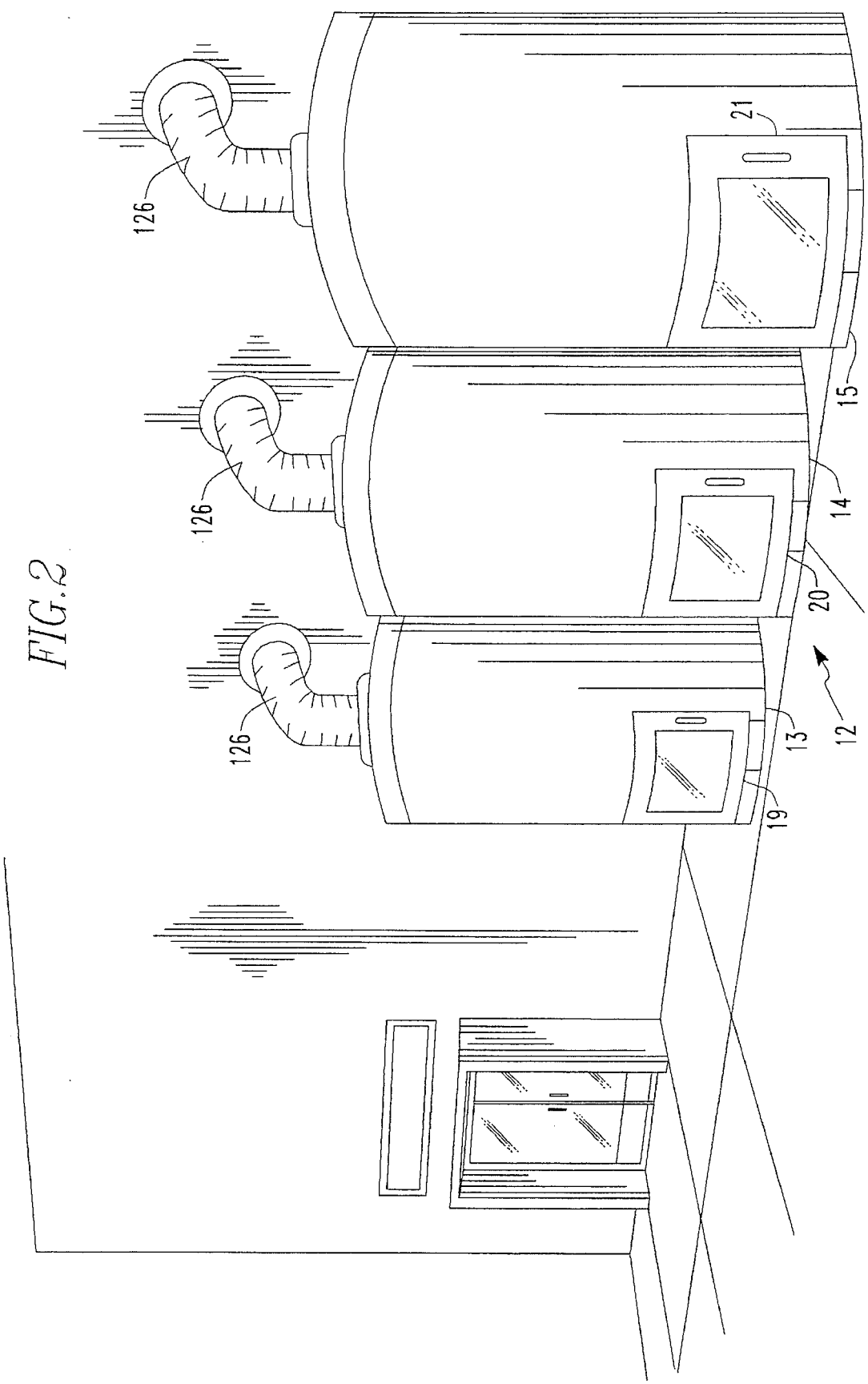
FIG. 2 is a perspective view of an alternate embodiment of the storage means for the commodity collection, densification and storage assembly of the present invention showing storage means remotely located from the housing.

As shown in FIGS. 1 and 2, each storage bin may receive one type of densified commodity. For example, storage bin 13 stores densified cans, storage bin 14 stores densified glass, and storage bin 15 stores densified plastic. Alternately, one storage bin containing a number of storage compartments with each compartment storing a different densified commodity may be provided. Further, additional storage bins or compartments may be provided for storing densified commodities of the same composition but of a different color. For example, a separate bin or compartment may be provided for storing clear glass, green glass, and brown glass, or for storing clear plastic, and colored plastic.

As shown in FIG. 2, the storage bins 13, 14 and 15 may be located remotely from the housing 11. Such an arrangement is beneficial to a retailer that does not have space available to provide the housing 11 and storage bins 13, 14 and 14 all in one location. Each of the storage bins 13, 14 and 15 is connected to the housing 11 by an inlet pipe 126, which carries the densified commodity from the housing to the corresponding bin. Preferably, each of the storage bins 13, 14 and 15 includes an access opening 19, 20 and 21, respectively, for removing densified commodities from the storage bin.

Alternatively, a plurality of housings 11 may be provided together in one location to allow a number of consumers to simultaneously insert recyclable commodities. Where a plurality of housings 11 are provided, each may be attached to a separate set of storage bins 13, 14, 15, or each housing may be attached to the same set of storage bins with a given bin receiving all of one type of recyclable commodity from all of the housings.

In accordance with the present invention, an acceptance assembly for the commodity collection densification, and storage assembly is provided in the housing and includes a frame. As broadly embodied in FIGS. 3–5, acceptance assembly 200 includes a frame 210 mounted in the housing 11. The frame 210 includes a rear support 212 attached to two side supports 214 and to a top support 216 to form an integral unit. A front support 218 is pivotably secured at its bottom end 218a to the side supports 214 by pins 215 protruding from the side supports. An opening 222 extends through the front support 218 so that commodities can pass into the frame 210 through the front support.

The top end 218b of the front support 218 is detachably secured to the top support 216, for example, by nuts and bolts, or any other suitable connector. Thus, when the top end 218b of the front support 218 is detached from the top support 216, the top end of the front support can be pivoted on the pins 215 away from the rear support 212. This pivoting allows parts of the acceptance assembly 200 which fit within the interior of the frame 210 (to be described below) to be cleaned or serviced. In order to further facilitate such cleaning or servicing, the frame 210 is supported in the housing 11 by runners 220 preferably mounted to the side supports 214 of the frame via rollers 224, or other similar friction reducing structure. Thus, the entire frame 210 may be slid out of the housing 11 on the runners 220.

In accordance with the invention, the acceptance assembly further includes an insert tube disposed in the frame defining an inlet for receiving a commodity, and an outlet. As broadly embodied herein and as shown in FIGS. 3, 4, 6 and 7, an insert tube assembly 230 is secured to the frame 210. The insert tube assembly 230 includes an insert tube 231 having an inlet 232 which communicates with the opening 30 in the front wall 11a of the housing 11. The insert tube 231 also has an outlet 233 which is secured via a cover member 326 of an iris device 310, as will be described below, to the front support 218 of the frame 210 so that the outlet is aligned with the opening 222 in the front support. A hole 234 through the top of the insert tube 231 provides access to the inside of the insert tube from above.

Preferably, the acceptance assembly includes means for drawing the commodity through the insert tube. The means for drawing the commodity preferably includes a driven roller supported by the frame and disposed in the insert tube, the driven roller being driven in a direction to draw the commodity from the inlet through the outlet. As broadly embodied in FIGS. 6 and 7, the means for drawing the commodity through the insert tube 231 includes a first roller assembly 240 mounted on the insert tube. The first roller assembly 240 includes a pair of brackets 241 secured to the top of the insert tube 231 next to the hole 234. The brackets 241 are secured together by a spring plate 242, and an axle 244 extends through holes in the brackets. Two side plates 246 are pivotably mounted on the axle 244 and are secured together by a support member 248 so that the side plates move about the axle in tandem. A roller 250 is mounted on another axle 252 supported by the side plates 246. A spring 254 is secured between the spring plate 242 and the support member 248 and pulls upward against gravity to hold the side plates 246, and thus the roller 250, in the center of (and spaced upward from the bottom of) the insert tube 231. The roller 250 is thus disposed in the position shown in FIG. 7 when the device is not in use.

A motor 256 secured to one of the brackets 241 turns the axle 244 and a gear 245 mounted on the axle. Two transfer gears 247 are mounted on one plate 246 and form a gear drive chain linking the motor output gear 245 and the roller gear 243 to thus drive the roller 250. The motor 256 rotates the roller 250 in a direction to draw the inserted commodity from the inlet 232 of the insert tube 234 to the outlet 233. If the commodity is larger than the space beneath the roller 250, the plates 246 can pivot upward, aided by the spring 254, to allow the commodity to pass, while the roller is still being driven by the motor 256. In this way, contact by the roller 250 with commodities of varying sizes is ensured as they pass through the insert tube 231.

Preferably, the means for drawing the commodity further includes at least one roller supported by the frame and disposed in the insert tube opposite the driven roller cooperating with the driven roller to direct the commodity from the inlet through the outlet. As broadly embodied in FIGS. 6 and 7, a second roller assembly 270 is provided at the bottom of the insert tube 231 opposite the first roller assembly 240. The second roller assembly 270 preferably includes at least one roller 272 mounted on an axle 274. More preferably, the second roller assembly 270 includes a plurality of rollers 272 mounted on a plurality of axles 274. The axles 274 are mounted in brackets 276 attached to the insert tube 231 so that the circumferential outer surfaces of the rollers extend through openings 236 in the bottom of the insert tube. Such extension allows the rollers 272 to contact commodities passing through the insert tube 231 to cooperate with the driven roller 250 to feed them toward the outlet 233.

Figure 6:
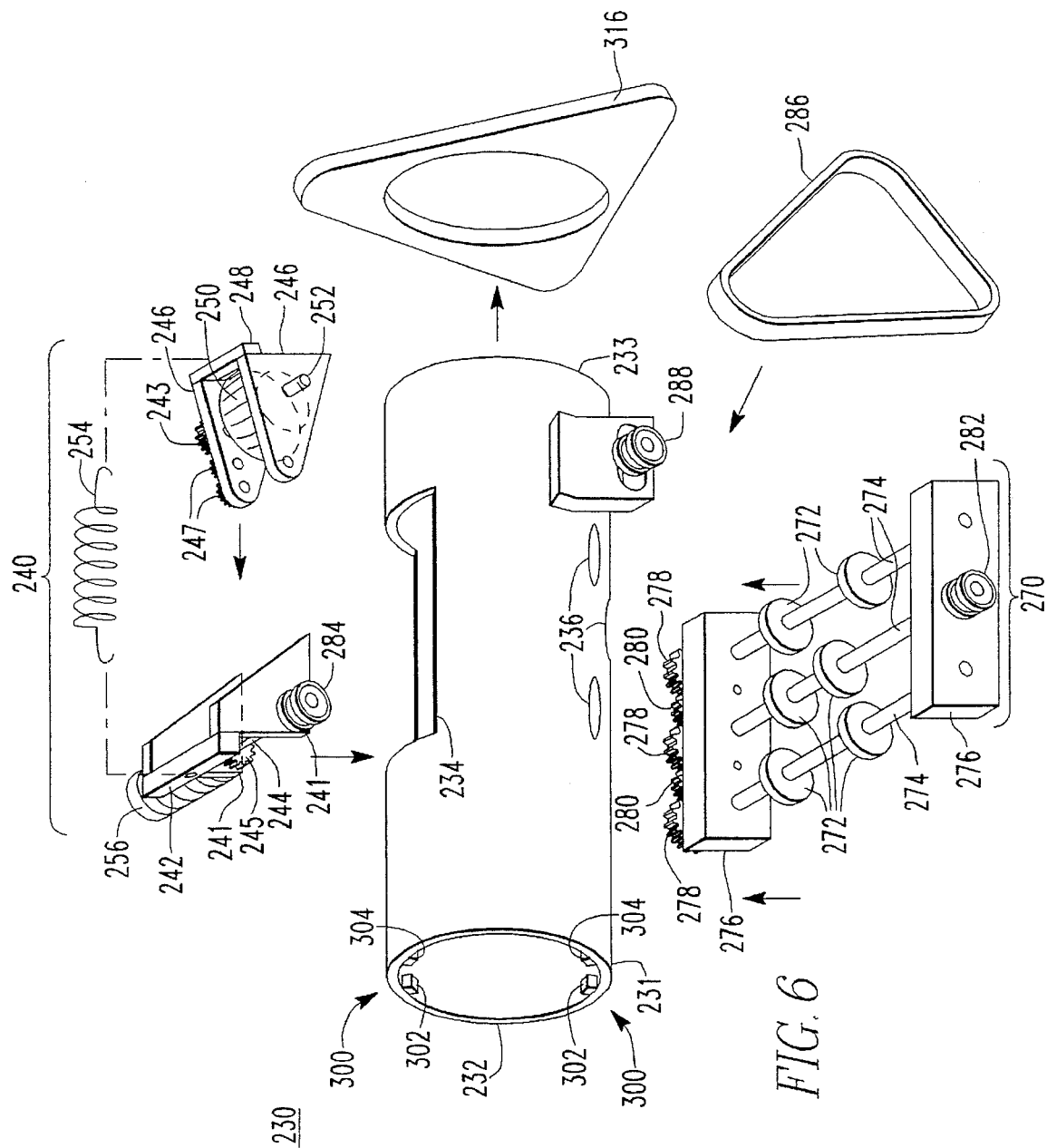
FIG. 6 is a partially-exploded perspective view of the insert tube assembly of the acceptance assembly of the present invention.
Figure 7:
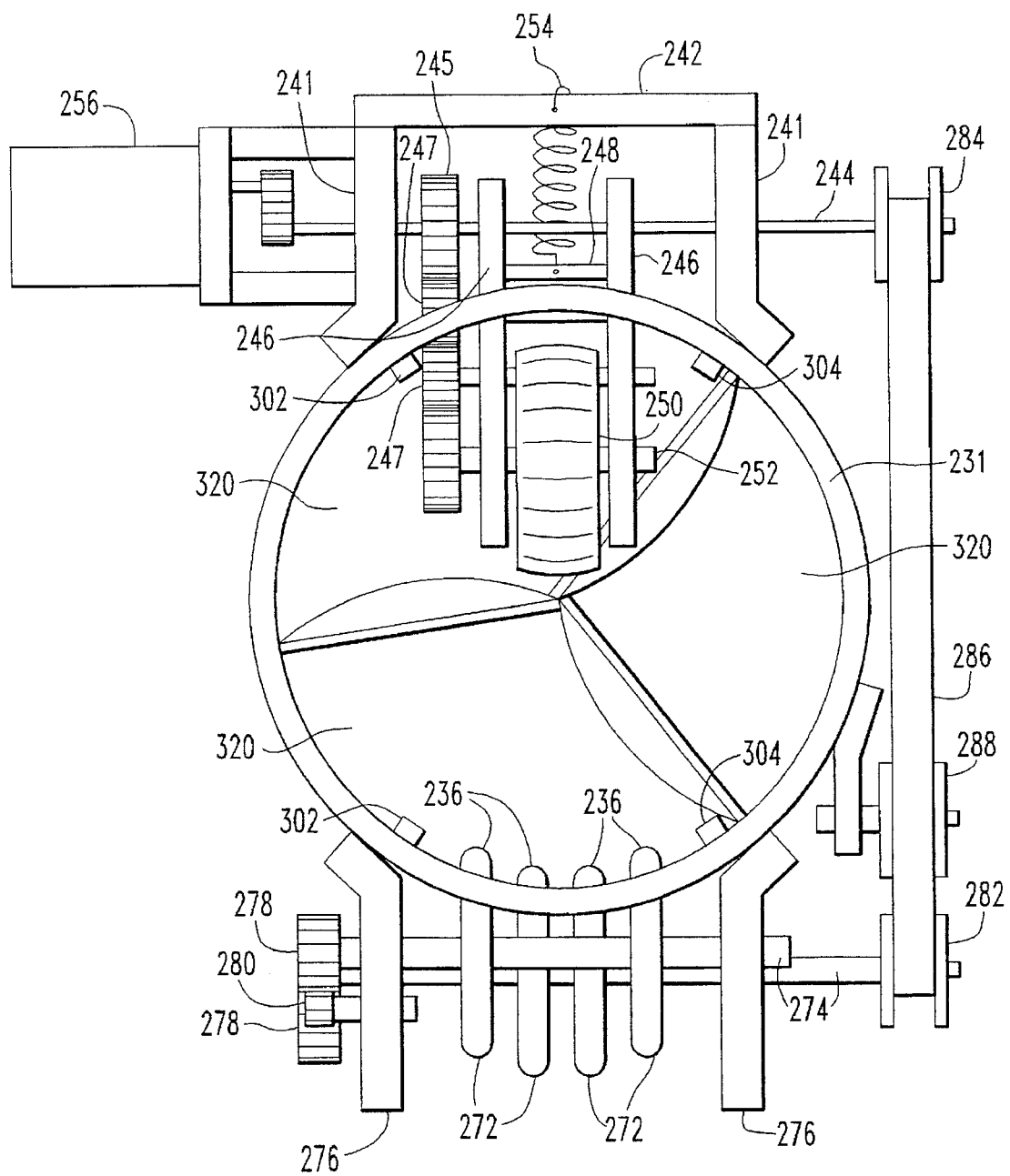
FIG. 7 is a front view of the assembled insert tube assembly of FIG. 6.

As shown in FIGS. 6 and 7, the spacing of the rollers 272 may be staggered across the bottom of the insert tube 231 so that commodities of different shapes and sizes may readily pass through the insert tube. The rollers 272 closest to the six o'clock position inside the insert tube 231 (as shown in FIG. 7) may extend upward into the insert tube to a slightly lower height than do the rollers spaced outwardly further. Such roller spacing facilitates the passing of rounded commodities through the insert tube 231.

Offset roller spacing may be achieved in one of two ways. As shown in FIG. 7, the axle 274 holding the rollers 272 which are closest to the six o'clock position (the center axle in FIG. 6) may be mounted in the brackets 276 slightly lower than the other axles 274, all of the rollers having equal circumferences. Alternately, the rollers 272 closest to the six o'clock position may have a smaller diameter than the outermost rollers.

Preferably, the rollers 272 of the second roller assembly 270 rotate simultaneously at the same speed. In order to rotationally join the rollers 272 and axles 274, a gear 278 may be attached to an end of each of the axles 274. The axle gears 278 mesh with transfer gears 280 mounted on one of the brackets 276 adjacent the axle gears 278. In this way, all of the axles 274, and thus all of the rollers 272, rotate together at the same speed to move commodities through the insert tube 231.

The rollers 272 may be driven or undriven. If driven rollers 272 are desired, the rollers may be drivingly engaged with the motor 256 by any suitable mechanism. For example, as shown in FIGS. 6 and 7, a pulley 282 attached to one end of one of the axles 274 cooperates with another pulley 284 attached to the axle 244 driven by the motor 256. A belt 286 transfers rotation from pulley 284 to pulley 282, thereby rotating all of the axles 274 and rollers 272. If desired, a tensioning pulley 288 may be mounted to the insert tube 231, the position of the tensioning pulley being adjustable to maintain proper tension between the belt 286 and the pulleys 282 and 284. Thus, when the motor 256 is energized, the roller 250 and the rollers 272 are rotated to draw in the commodity.

Alternately, the pulleys 282, 284, and 286, and the belt 286 may be eliminated, thereby providing undriven rollers 272. If the rollers 272 are to be undriven, the gears 278 and 280 may still be employed to cause the rollers to rotate in unison, if desired. The rollers 272 are thus rotated by frictional contact with the commodity as it is moved past them by the driven roller 250.

Preferably, the acceptance assembly includes a container present sensor disposed adjacent the inlet of the insert tube for sensing the presence of a container in the inlet, the driven roller rotating responsive to the container present sensor sensing a container in the inlet. As broadly shown in FIG. 6, a container present sensor 300 may be disposed in the insert tube 231 adjacent the inlet 232. The container present sensor 300 may comprise, for example, a conventional electric-eye or an acoustic device for detecting the presence of an object within the inlet 232.

The container present sensor 300 may comprise at least one infrared sensor including an emitter 302 and a receiver 304 disposed within the inlet 232. Such a container present sensor 300 includes a plurality of such infrared sensors for improved sensing. When an object is placed into the inlet 232, the infrared light emitted by each emitter 302 is reflected off the object and received by the receivers 304. When the receivers 304 detect an object in the inlet 232, a microprocessor 130 activates the motor 256 to draw the container through the insert tube 231. Alternatively, sensors such as a retro-reflector or a proximity detector may be employed as the container present sensor.

In accordance with the invention, the acceptance assembly includes a sensor disposed in the frame proximate the outlet for sensing a feature of the commodity. As broadly embodied in FIG. 4, the acceptance assembly 200 includes a feature sensor device 70 disposed in the frame 210. The feature sensor device 70 senses at least one of a number of discernible features of the commodity inserted through the insert tube 231. For example, the feature sensor device 70 may sense the commodity features of material of composition, color, or weight. The feature sensor device 70 may also sense and read the commodity feature of a bar code or an engraved mark disposed on the commodity.

Figure 11:
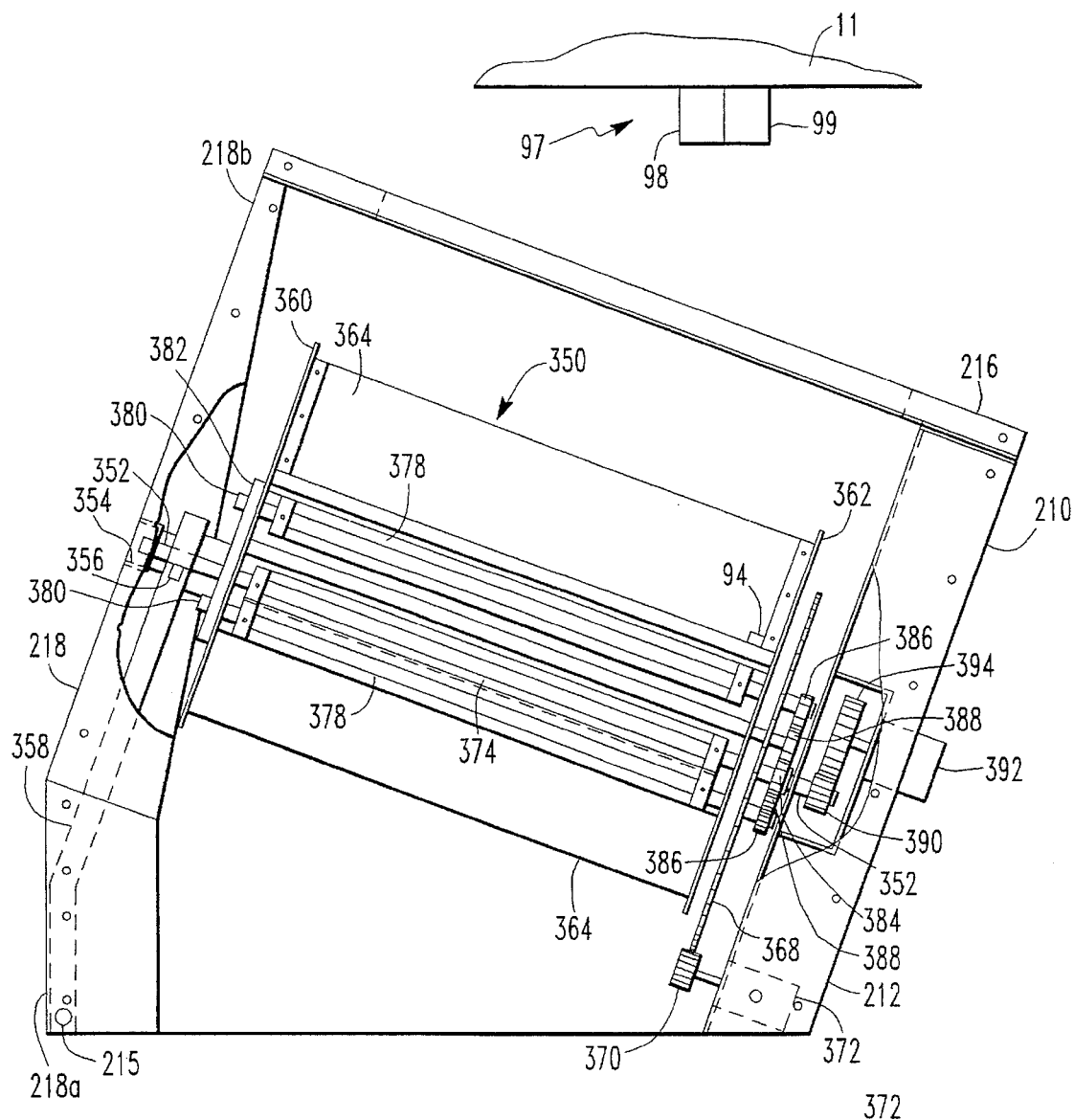
FIG. 11 is a partial section side view of the separation mechanism of the present invention.

For example, as shown in FIG. 11, the sensor device 70 may include a laser scanning device 97 attached to the housing 11 or frame 210 for detecting the presence of and reading a bar code (UPC). As disclosed in U.S. Pat. No. 4,784,251, owned by Applicants' Assignee, the description of which is incorporated herein by reference, the laser scanning device 97 may include a low power laser emitter 98 and a laser reader 99. The inserted commodity is scanned while positioned atop the separation device 350, which will be described later in detail. The laser emitter 98 of the laser scanning device 97 projects a light pattern across the surface of the inserted commodity which is received by the laser reader 99 thereby reading the bar code. The rollers 374, 378 of the separation device 350 are rotated to thereby also rotate an inserted commodity sitting on the rollers 374, 378 to ensure that the laser scanning device 97 reads the bar code.

If the laser scanning device 97 does not detect a bar code on the inserted commodity, the commodity may be rejected, if desired, and returned to the consumer through the reject port 32. Further, if the laser scanning device 97 does detect and read a bar code but cannot match that bar code with a predetermined list of container barcodes, the inserted commodity may also be rejected, if desired. If the laser scanning device 97 does detect, read, and match a bar code with a predetermined code, the commodity is densified and stored according to other information obtained by the feature sensor device 70. Of course, the laser scanning device 97 is optional, and the microprocessor 130 programming which controls it may be tailored to accept or reject various commodities based on various criteria within the scope of the invention, as is well known in the art.

Alternatively, the scanning device 97 can read surface deviations engraved on the container, as disclosed in Applicants' Assignee's copending application, U.S. Ser. No. 08/214,498, filed Mar. 18, 1994, the description of which is incorporated by reference. The basic operational principles of the surface deviation reader are the same as for the bar code reader described above.

Figure 13A:
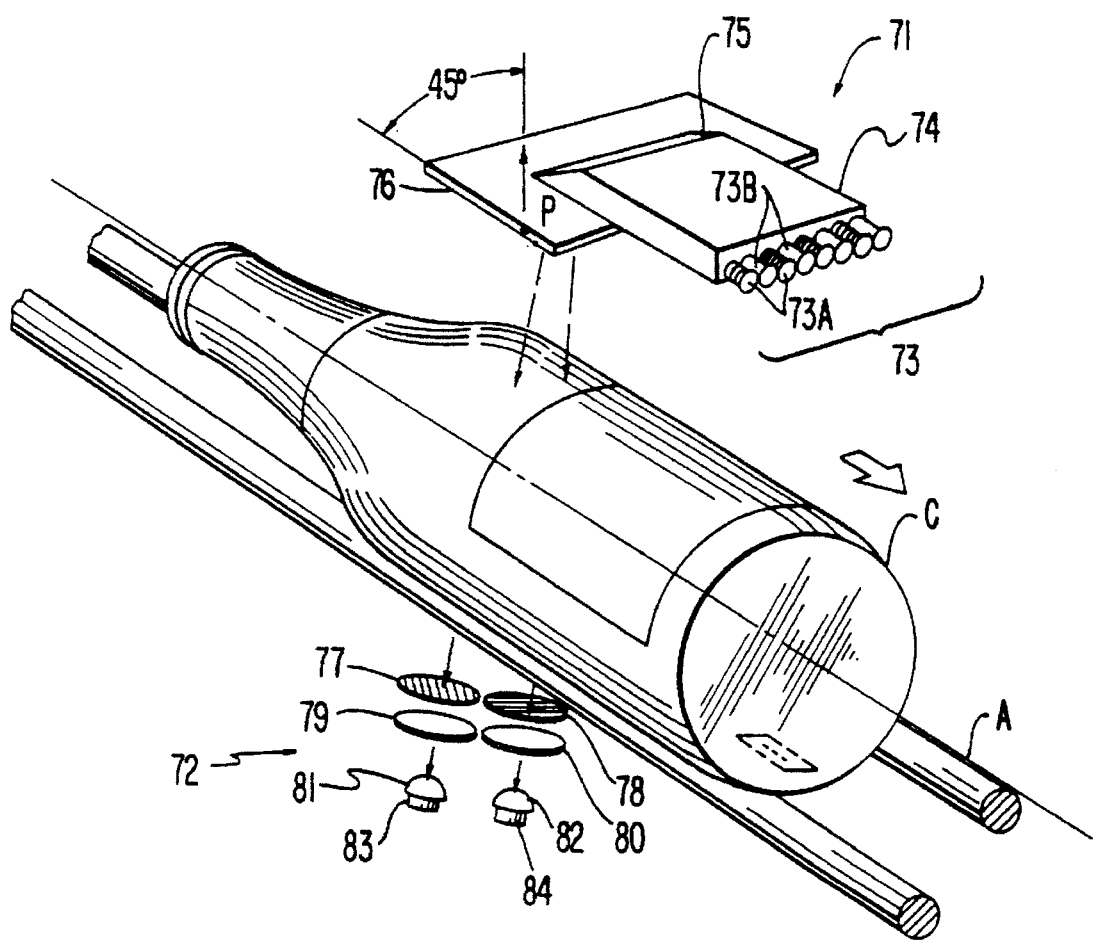
FIG. 13A is a perspective view depicting operation of the second sensor means for determining a composition and color of the inserted commodity.
Figure 13B:
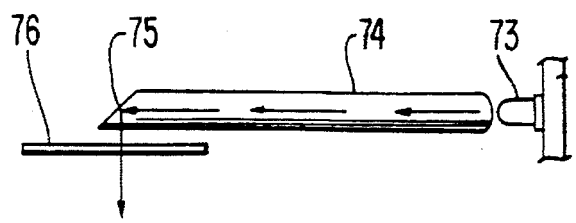
FIG. 13B is a side view of the second sensor means of FIG. 13A showing the path of the sensing light beam through the optical coupler.
Figure 13C:
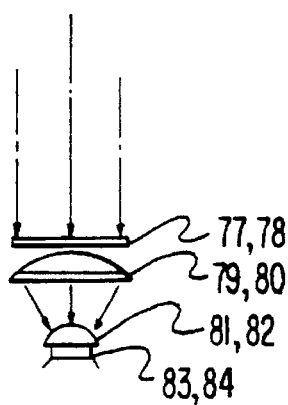
FIG. 13C is a side view of the second sensor means as in FIG. 13A showing the path of the sensing light beam through the lenses to the photodiode.

Preferably, the feature sensor senses a commodity composed of glass or plastic and further senses a color of the commodity. As broadly embodied herein and as shown in FIGS. 13A, 13B, and 13C, the feature sensor device 70 comprises means for sensing the composition and color of glass and plastic commodities which are not opaque. Such a sensing device is disclosed in U.S. Pat. No. 4,919,534, owned by Applicants' Assignee, the description of which is incorporated herein by reference. In such a device, an inserted commodity C passes between a light source assembly 71 and a light analyzer assembly 72. The light source assembly 71 includes a plurality of light emitting diodes 73 disposed opposite an optical coupler 74 made of optical plastic. The diodes 73 include two different types 73a, 73b, which emit two different wavelengths of light and are spaced alternately across the optical coupler 74. Inside the optical coupler 74, the light from the diodes 73a, 73b is diffused from that of discrete points into a continuous band of light having different wavelengths through a reflection on surface 75. The reflected light passes through a polarizing plate 76 which polarizes the light in the direction shown by arrow P in FIG. 13A. For best detection of PET and exclusion of vinyl, the polarizing direction of plate 76 should be preferably offset 45° from the direction of the center axis A of the inserted commodity C.

The light beam then passes through the container C (if the container is at least partially transparent) and is received by the light analyzer assembly 72. The light analyzer assembly 72 includes a parallel polarizer 77 having a polarization direction parallel to that of polarizing plate 76, and a cross polarizer 78 having a polarization direction orthogonal to the polarization direction of the polarizing plate 76. The portions of the light beam emitted by the diodes 73 which pass through the polarizers 77, 78, then pass through converging lenses 79, 80 and field lenses 81, 82 to be received by photodiodes 83, 84.

Through use of a microprocessor (not shown), the feature sensor device 70 determines the composition of the commodity C by evaluating whether the polarization of the light passing through the container was changed from the direction P of the polarizing plate 76 thereby allowing light to be received by the photodiode 84 corresponding to the cross polarizer 78. Glass and vinyl containers do not scatter or alter the polarization of light passing through them. Therefore, just as if no container or an opaque object were present, no light passes through the cross polarizer 78 after passing through a glass or vinyl container. PET and polystyrene containers do alter the polarization, therefore light does pass through the cross polarizer 78 after passing through the container C. It is believed that this effect is caused by the molecular structures of the containers and the methods of their manufacture.

The feature sensor device 70 determines the color of the inserted commodity by determining how much of each wavelength of light from the different colored diodes 73a, 73b was absorbed in passing through the commodity. Two different photodiodes 83, 84 are required for color sensing because sensing the color of both scattering and nonscattering containers must be performed after the light passes through the polarizers 77, 78.

Alternately, instead of different colored diodes 73a, 73b, white light could be generated and then filtered to provide varying wavelengths of light to perform the color sensing via a separate mechanism. Therefore, for composition sensing, only one color diode would be necessary in the above light source assembly 71. Further, only one photodiode 84 and the cross polarizing plate 78 are required for composition sensing.

Alternatively, the sensor disclosed in Applicants' Assignee's copending application Ser. No. 08/144,030, filed Nov. 1, 1993, the description of which is incorporated by reference, may also be used in feature sensor. Further, any other sensor known to one skilled in the art for sorting glass from plastic, for sorting plastic containers by their composition, or for sorting glass and/or plastic containers by their color may be used as feature sensor within the scope of the invention.

Figure 14A:
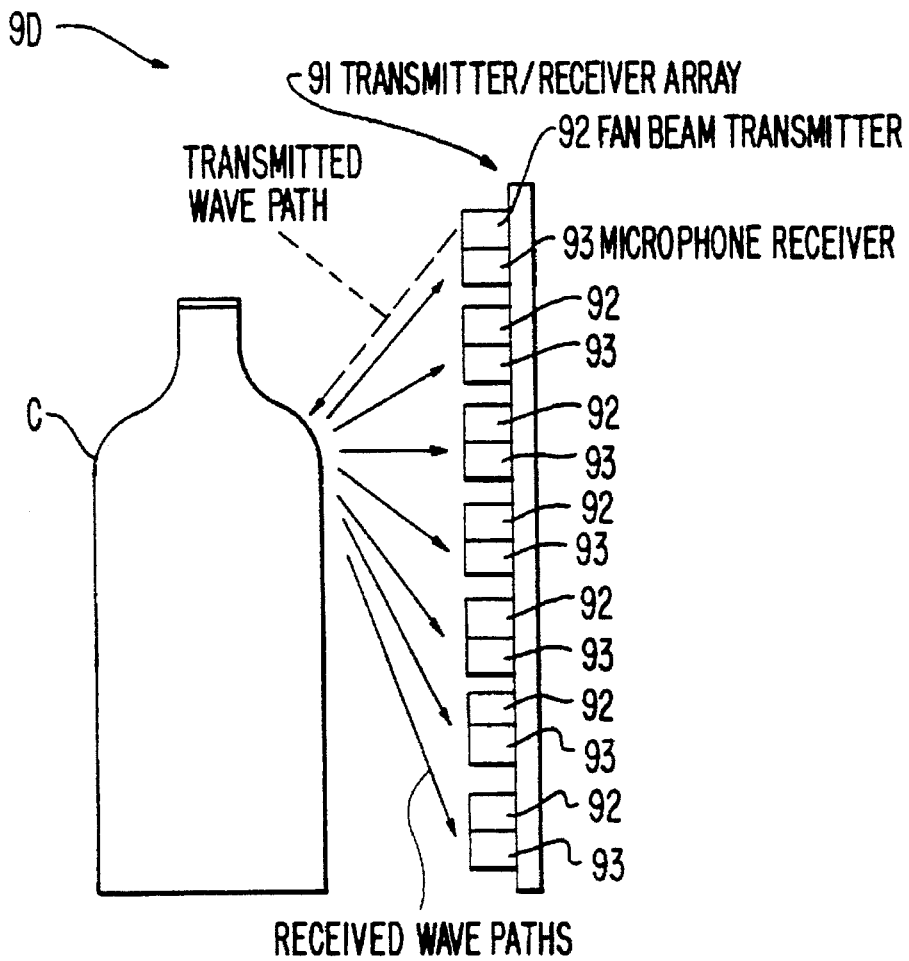
FIG. 14A is a diagrammatic side view of another possible sensing mechanism which can be included as an option with the second sensor means, for determining the shape of an inserted commodity showing transmitted and received wave signal paths.
Figure 14B:
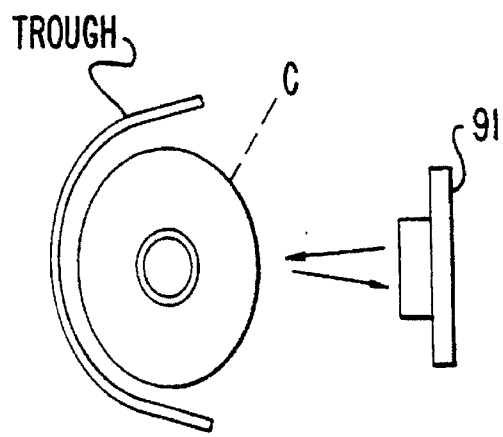
FIG. 14B is a top view of the mechanism shown in FIG. 14A, showing the arrangement of the inserted commodity and the transmitter/receiver array.

Preferably, the feature sensor further senses the shape of a commodity. As broadly embodied herein and as shown in FIGS. 14A and 14B, feature sensor device 70 may further include an acoustic measurement device 90 for sensing the shape of an inserted commodity C. Such an acoustic measurement device 90 is disclosed in U.S. Pat. No. 5,068,835, owned by Applicants' Assignee, the description of which is incorporated herein by reference. The acoustic measurement device may include a transmitter/receiver array 91 including a plurality of pairs of fan beam transmitters 92 and microphone receivers 93. The transmitters 92 transmit a high frequency ultrasonic signal, preferably with a frequency of approximately 50 kHZ and a wavelength of approximately 0.27 inches. The receivers 93 measure the phase of the reflected signals from the transmitters 92. A microprocessor 130 compares the received data to precalculated reference data corresponding to various different containers in order to recognize the shape of the container.

Figure 12:
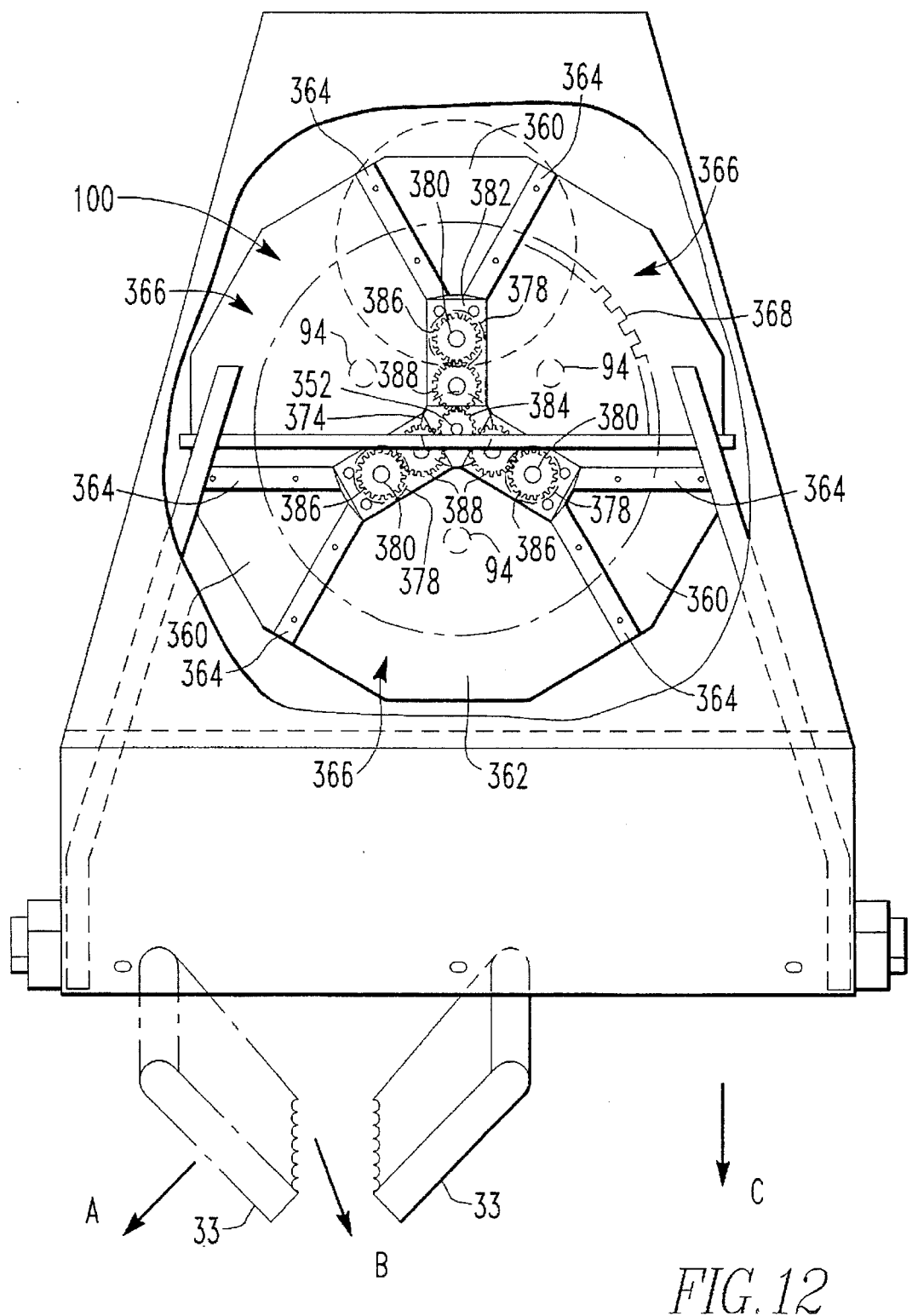
FIG. 12 is a partial section front view of the separation mechanism of FIG. 11 viewed along line XII in FIG. 11.

The feature sensor may also preferably sense a weight of the commodity. As broadly embodied herein and as shown in FIG. 11 and 12, the feature sensor device 70 may include at least one weighing device 94 for sensing the weight of a commodity so that an object above a predetermined weight is returned to the consumer via the reject port 32. The weighing device 94 may comprise at least one compression scale or piston disposed on the of the separation device 350 and weighing may be performed either before or after the optional reading of the bar code by the laser scanning device 97. Due to the slant of the separation device 350 from the horizontal, commodities passing through the iris device 310 will settle against the weighing device 94. Rejection of overly heavy items prevents passing of full containers or other inappropriate objects to the densification assembly 110 which could result in undesirable mixture of waste with densified commodities and the potential need for maintenance of the assembly due to fouling, clogging or damage.

Figure 15:
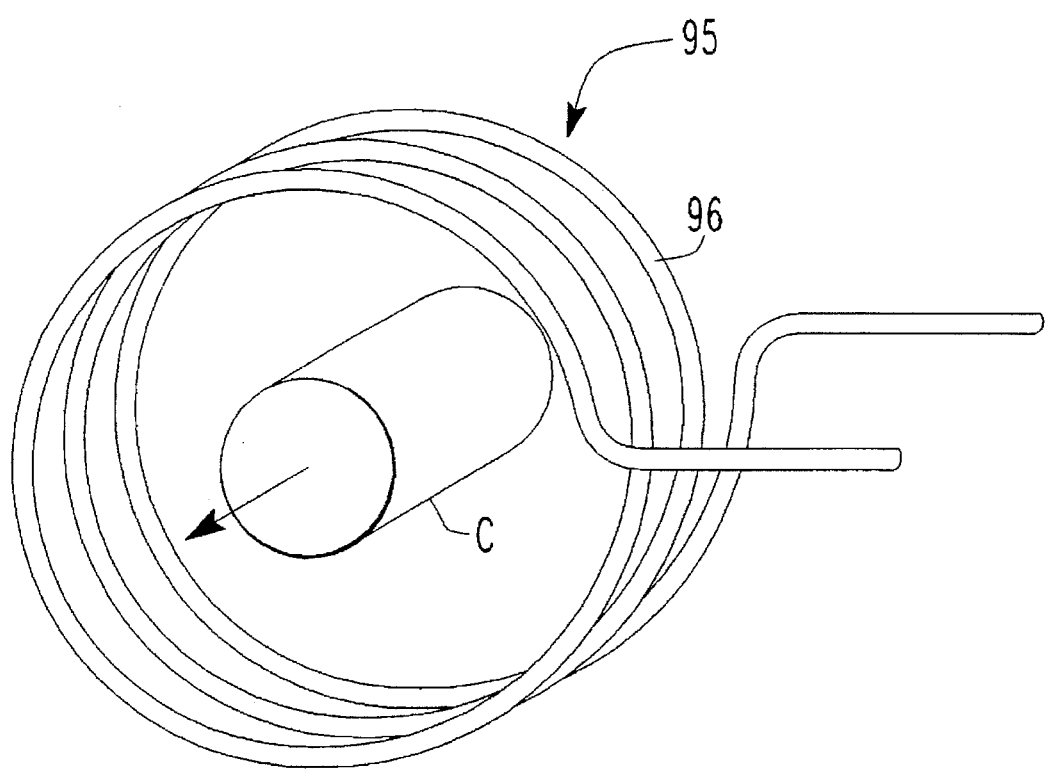
FIG. 15 is a diagrammatic front view of the second sensor means for determining the composition of a commodity showing a coil for sensing a metal can.

Preferably, the feature sensor senses a commodity composed of metal. As broadly embodied herein and as shown in FIG. 15, the feature sensor device 70 may also include a metal sensor 95 comprising an electrified coil 96 through which the inserted commodity C passes. Such devices are well known in the art and may be incorporated into the present invention by one of ordinary skill. In the metal sensor 95, a current passes through the coil 96 creating an electromagnetic field. The metal sensor 95 may measure change in phase and amplitude of the electromagnetic field, or the change in impedance of the coil, caused by the inserted commodity to differentiate aluminum and steel commodities. The metal sensor 95 may also measure the change in voltage across the coil caused by insertion of the commodity. If current through the coil is kept constant, steel commodities will cause a change in impedance or voltage of much greater magnitude than will aluminum commodities. Plastic or glass commodities will cause virtually no change in voltage or impedance. After sensing by the metal sensor 95, aluminum, plastic, and glass commodities are densified, and steel commodities are returned to the consumer via the reject port 32. Any suitable metal sensor, and preferably one that can distinguish aluminum from steel, known to one skilled in the art may be employed within the scope of the invention. For example, the device disclosed in U.S. Pat. No. 5,028,870, owned by Applicants' Assignee, may be employed.

In accordance with the invention, the acceptance assembly includes an iris device disposed in the frame between the outlet and the feature sensor, the iris device having a base secured to the frame and defining an opening therethrough adjacent the outlet, and three plates swingably secured to the base. The plates are pivotable between a first position covering the opening and the outlet and a second position uncovering the opening and the outlet, the iris device precluding access to the feature sensor via the inlet of the insert tube when the iris device is in the first position.

As broadly embodied in FIGS. 8, 9, 10A, and 10B, an iris device 310 is secured to the frame 210. The feature sensor device 70, which may include any or all of the feature sensors discussed above, is disposed on the opposite side of the iris device 310 than the outlet 233 of the insert tube 231. The iris device 310 includes a base member 312 secured to the front support 218 of the frame 210. An opening 314 in base member 312 is aligned with the opening 220 in the front support 218. A cover member 316 is secured to the base member 312 so that there is a clearance between the base member and the cover member. The cover member 316 defines an opening 318 aligned with the opening 314 of the base member 312. The outlet 233 of the insert tube 231 is secured to the cover member 316 of the iris device 310, thereby securing the insert tube to the frame 210.

Figure 10A:
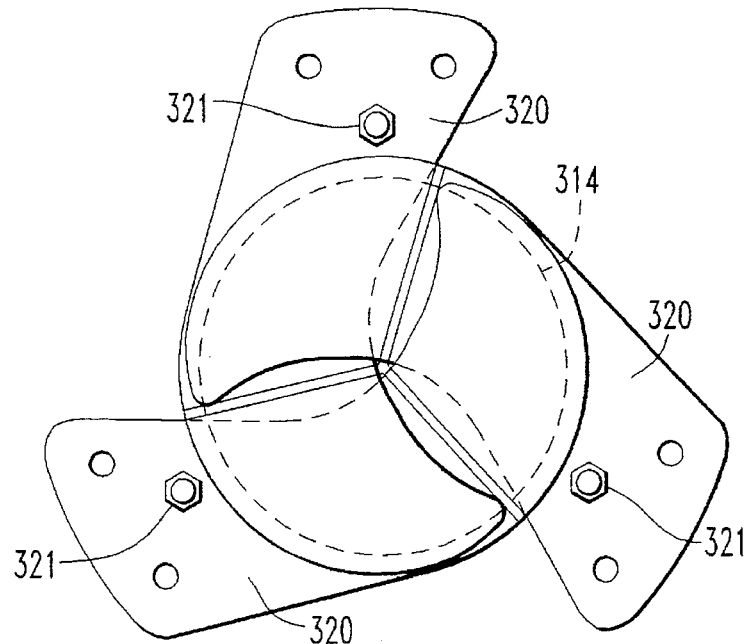
FIG. 10A is a front view of three plates of the iris device of FIG. 8 in a first closed position.
Figure 10B:
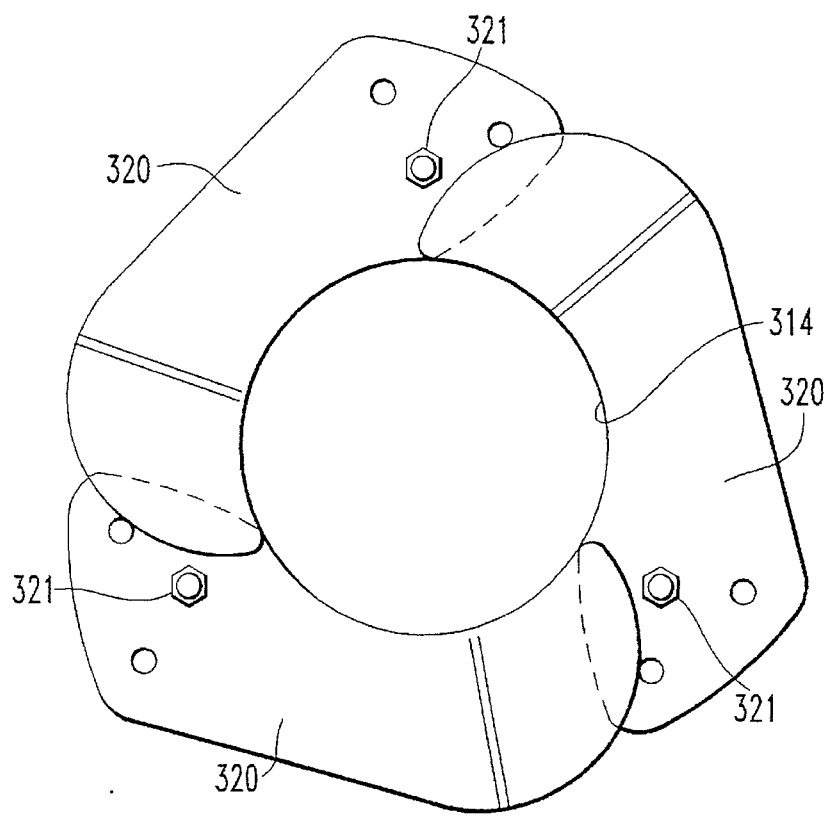
FIG. 10B is a front view of three plates of the iris device of FIG. 8 in a second open position.

Three plates 320 are swingably secured between the base member 312 and the cover member 316 of the iris device 310. Each plate 230 is secured between the base member 312 and cover member 316 by a bolt or pin 321 about which the plate pivots. The plates 320 may be moved between a first position, as shown in FIG. 10A covering the opening 314 of the base member 312, and a second position, as shown in FIG. 10B, uncovering the opening. Thus, when the plates 320 are in the first position, the outlet 233 of the insert tube 231 is closed, and when the plates are in the second position, the outlet of the insert tube is opened. When the plates 320 are in the first position, access through the insert tube 231 into the inside of the frame 210, and thus to the second sensor device 70 and the other elements within the frame, is prevented.

Figure 8:
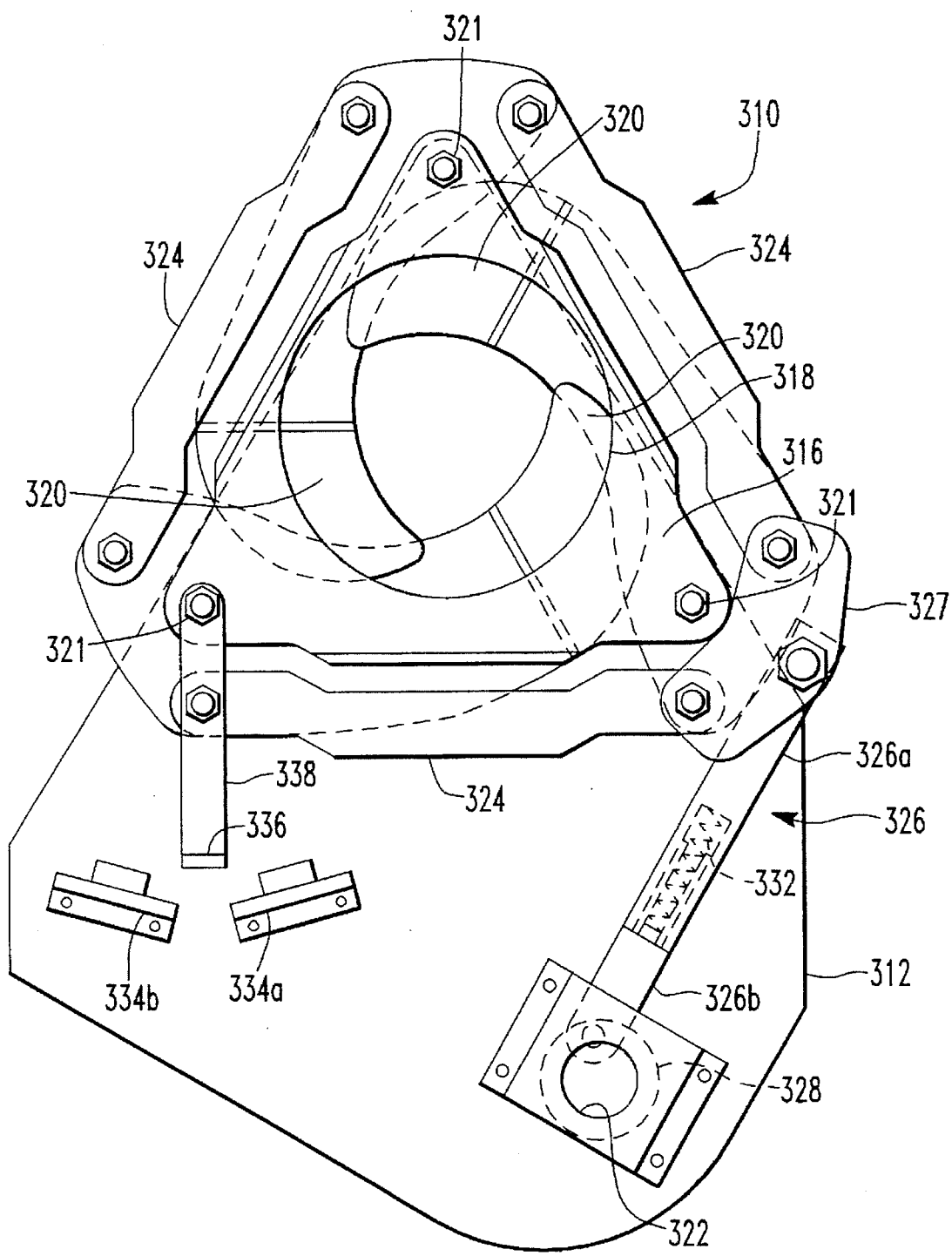
FIG. 8 is a front view of the iris device of the acceptance assembly of the present invention.
Figure 9:
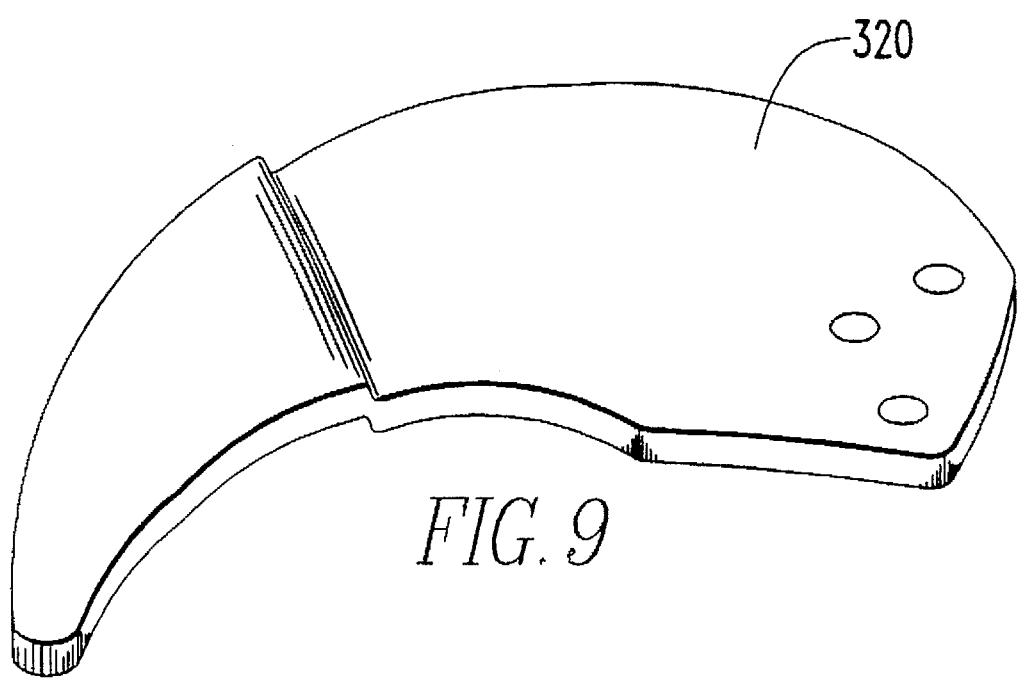
FIG. 9 is a perspective view of one plate of the iris device of FIG. 8.

Preferably, as shown in FIG. 8, three connector bars 324 are pivotably secured to the plates 320, each connector bar being secured to two of the plates by bolts 321. The connector bars 324 are attached to the plates 320 at points spaced from the bolts 321 in such a way that movement of one of the plates is transmitted to all of the plates via the connector bars causing the plates to move in unison.

A servo motor 322 is mounted to the base member 312 to drive the plates 320 between the first position and the second position. The motor 322 is operatively engaged with one of the plates 320 via a spring-loaded arm 326 and a drive member 327. The arm 326 is pivotably secured to the drive member 327, which is in turn secured to two of the connector bars 324 at points spaced from the bolt 321 in the adjacent plates 320 so that movement of the arm via the motor 322 causes all the arms and plates to be moved in unison. Thus, the arm 326 causes the connector bars 324 to move the plates 320 to either cover or uncover the opening 314 in the base member 312, depending on the direction of the arm's movement. To provide the back-and-forth movement of the arm 326, the arm is eccentrically mounted on a pulley 328 secured to an output shaft of the motor 322.

Preferably, as a safety feature, movement of the plates 320 may be halted if something blocks their path. For example, the plates 320 may be blocked by a commodity too large to fit between the opened plates, a consumer's hand, or some other foreign object. Thus, the arm 326 is made of two pieces 326a and 326b slidingly engaging each other, with a compression spring 332 disposed in between. If the motor 322 is activated to move the plates 320 from the second (open) position to the first (closed) position, and the plates are impeded from moving to the first position, pieces 326a and 326b move relative to one another and the compression spring 332 is compressed. Therefore, the movement of the plates is stopped without damage to the motor, the plates, or whatever may be blocking the plates.

Preferably, the iris device includes a plate position sensing mechanism so that the position of the plates can be monitored. As broadly embodied in FIG. 8, two position sensors 334a, 334b are mounted on the base member 312, and a trigger plate 336 is mounted on a bar 338 extending from one of the plates 320. The bar 338 also engages one of the connector bars 324. When the plates 320 are in the first (closed) position, the bar 338 is positioned so that the trigger plate 336 is disposed in front of one position sensor 334a. When the plates 320 are in the second (open) position, the bar 338 is positioned so that the trigger plate 336 is disposed in front of the other position sensor 334b. The position sensors are connected to a microprocessor 130 which thereby tracks the position of the plates 320.

The motor 322 is controlled by the microprocessor as follows: When the container present sensor 300 senses the presence of a container in the insert tube 231, the microprocessor sends a signal to the motor 322 to drive the plates 320 until the position sensor 334b detects the trigger plate 336. The motor 322 is then stopped. After a brief amount of time (less than one second, for example) when the container should have passed through iris device 310, the microprocessor instructs the motor 322 to move the plates 320 in the opposite direction back to the first position. When the position sensor 334a senses the trigger plate 336, the microprocessor turns off the motor 322.

If a brief period of time (e.g., less than one second) elapses after the signal is given to move the plates 320 back to first (closed) position, and the position sensor 334b does not sense the trigger plate 336, the microprocessor instructs the motor 322 to drive the plates back to the second (open) position. This situation would occur if something were blocking the plates 320. After another brief period of time, the microprocessor again instructs the motor 322 to attempt to drive the plates 320 back to the first (closed) position. This process of moving the plates 320 back and forth may be repeated a number of times until the obstruction is cleared. If the obstruction is not cleared after a certain period of time or a certain number of iterations back and forth, the acceptance assembly 200 and entire collection, densification, and storage device is turned off.

In accordance with the invention, a separation means responsive to the second sensor means is provided for separating various commodities according to the sensed feature. Preferably, the separation mechanism includes a main axle, two end plates, and a plurality of dividers disposed between the end plates and extending substantially radially from the main axle, a pair of adjacent dividers defining a cradle therebetween, the end plates and dividers rotatably mounted as a unit to the main axle and rotating about the main axle to thereby place one of the cradles in position to receive the commodity after exiting the outlet. As broadly embodied in FIGS. 4, 11, and 12, the separation means comprises a separation device 350 mounted in the frame 210 of the acceptance assembly 200. The separation device 350 includes a main axle 352 mounted within the frame 210. The main axle 252 is supported at one end by a bracket 354 secured to the inside of the front support 218, and at the other end by the rear support 212. A cross bar 356 supported by two upwardly extending arms 358 also supports the main axle 352, and is useful in maintaining support of the axle when the front support 218 is pivoted out for obtaining access to the inside of the frame 210. Three generally triangular front end plates 360 and a rear end plate 362 are mounted about the main axle 352 so as to be rotational thereabout. Dividers 364 are mounted between the front and rear plates 360, 362 to join the plates together, thereby allowing rotation of the plates and dividers in a unit about the main axle 352. Adjacent pairs of the dividers 364 create a plurality of cradles 366 between the dividers. As shown in FIG. 12, three cradles 366 are provided.

Preferably, the separation means further includes means for rotating the end plates and dividers about the main axle.

More preferably, the means for rotating the end plates and side walls includes a drive gear mounted on one of the end plates and a motor secured to the frame, the motor driving the gear in one of two directions according to the feature sensed by the sensor. As shown in FIG. 11, a drive gear 368 is mounted to the rear plate 362. The teeth of the drive gear 368 mesh with the teeth of another gear 370 driven by a servo motor 372. Thus, rotation of the motor 372 causes the gear 370 to rotate the drive gear 368, thereby rotating the entire separation device 350 about main axle 352. Alternatively, the drive gear 368 arrangement may be replaced with a belt and pulley system (not shown), driven by the motor 372. However, using gears provides more precise positioning control.

Preferably, the separation means further includes a central roller secured to the main axle, the central roller including an outer surface extending into each of the cradles and rotating a commodity in a given cradle to assist the sensor means in sensing a feature of the commodity. As is broadly embodied in FIGS. 11 and 12, the separation device 350 includes a central roller 374 mounted for rotation with the main axle 352 so that rotation of the main axle also causes simultaneous rotation of the central roller. The outer surface 376 of the central roller 374 extends into each of the cradles 366 defined by the dividers 364, as shown best in FIG. 12. Thus, as described above, the container C sitting in the cradle can be rotated by rotating the central roller 374 to assist the operation of the feature sensing device 70.

Preferably, the separation means further includes a plurality of side rollers each defining an outer surface, each side roller mounted in one of the dividers so that the outer surface extends into the two adjacent cradles, the side rollers rotating the same direction as the central roller to assist the sensor means in sensing a feature of the commodity. As broadly embodied herein, side rollers 378 are provided within the dividers 364. The side rollers 378 are rotatably mounted on axles 380 which extend through the front and rear plates 360, 362 and the drive gear 368. A bearing block 382 is mounted on the front plate 360 to support the axles 352, 380 and to allow the axles to rotate relative to the front and rear plates 360, 362.

Preferably the separation means further includes a plurality of side gears, each mounted for rotation with one of the side rollers, and a plurality of transfer gears, each meshing with the central gear and one of the side gears so that the central rollers and the side rollers rotate in the same direction. As shown in FIGS. 11 and 12, a plurality of gears are provided for driving the axles 352, 380. A central gear 384 is mounted about the main axle 352 so as to rotate therewith, and side gears 386 are mounted about the axles 380, so as to rotate with the side axles. So that the central roller 374 and the side rollers 378 all rotate in the same direction (that is, clockwise or counterclockwise) transfer gears 388 are provided on axles between the central gear 384 and each of the side gears 386. If desired, another set of gears similar to gears 384, 386 and 388 can be placed about the axles 352, 380 on the front plate 360 to improve rotation of the rollers 374, 378.

Figure 5:
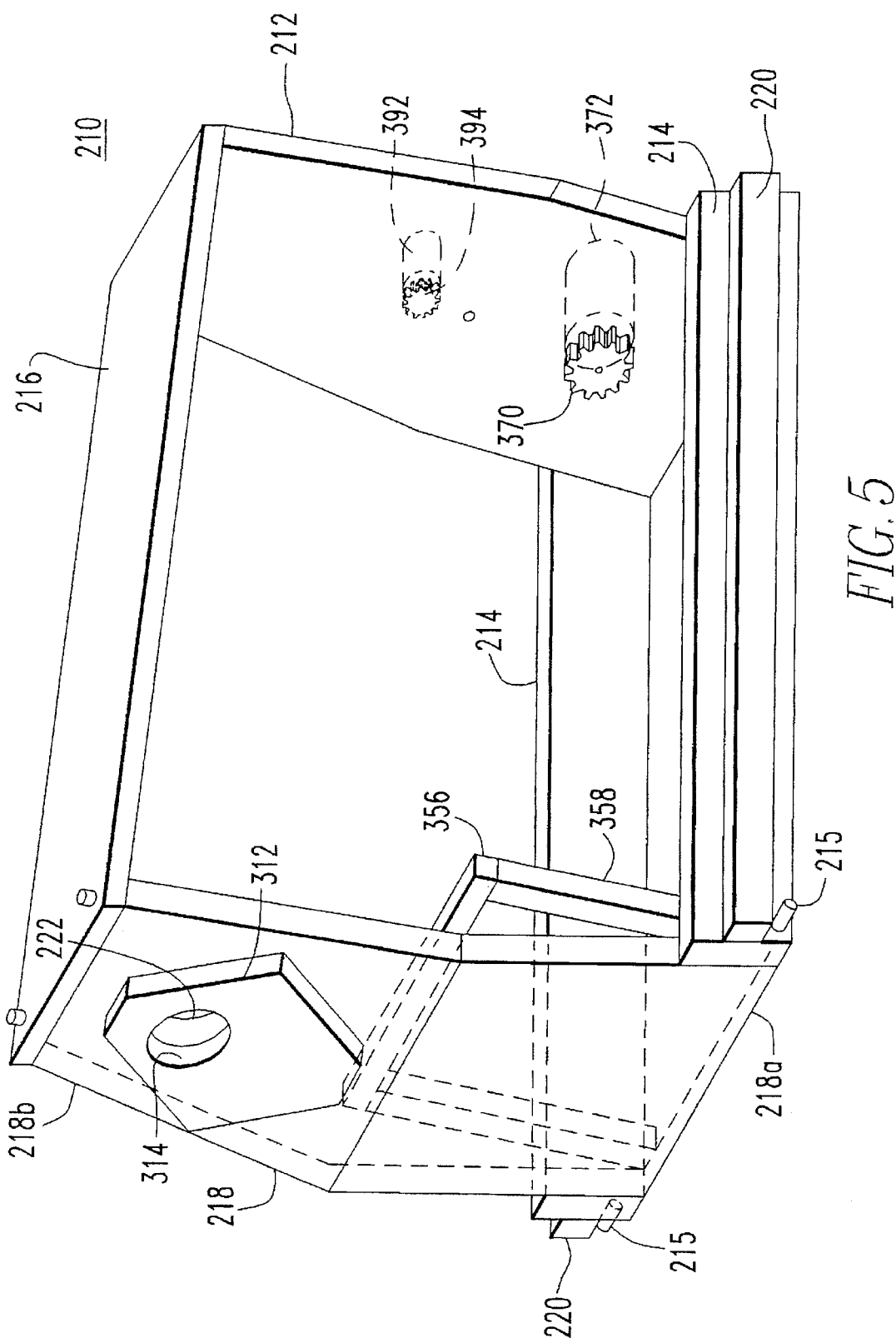
FIG. 5 is a perspective view of the frame of the separation mechanism of the acceptance assembly of the present invention.

Preferably, the acceptance assembly further includes means for rotating the rod to thereby rotate the central roller and the side rollers. As shown in FIGS. 5 and 11, a drive gear 390 is mounted on the main axle 352 for rotation therewith. A motor 392 is mounted to the rear support 212 so that an output gear 394 transfers the rotation of the motor 392 to the drive gear 390, and thus rotates all of the rollers 374, 378. The motor 392 can be rotated in either direction to thereby rotate the rollers 374, 378 in either direction. Alternately, a belt and pulley system (not shown) can be used to transfer the rotation of the motor 392 to the rollers 374, 378.

Figure 3:
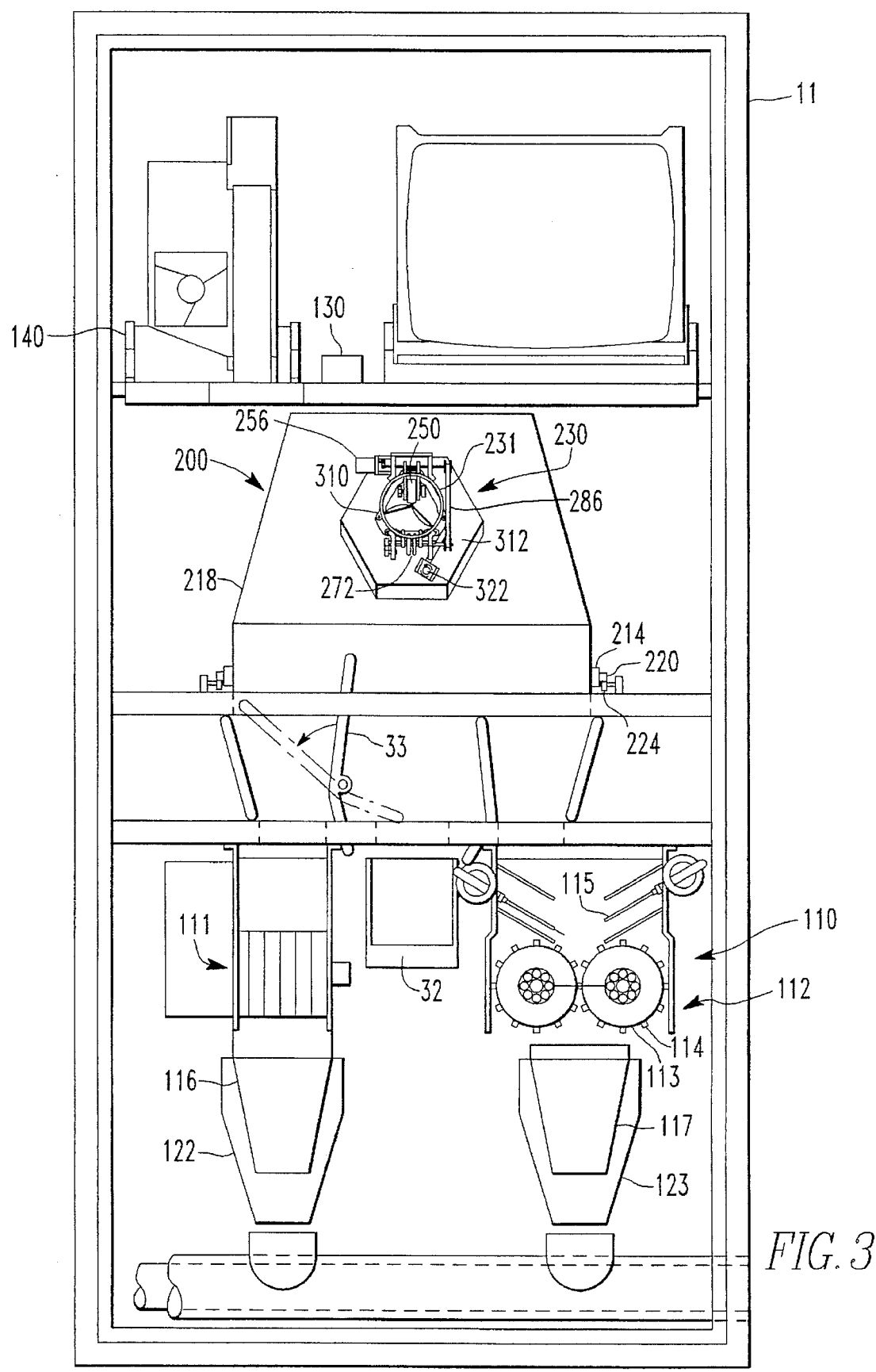
FIG. 3 is a front cutaway view of the housing of the commodity collection, densification and storage assembly of the present invention showing various elements of the assembly arranged within the housing.
Figure 4:
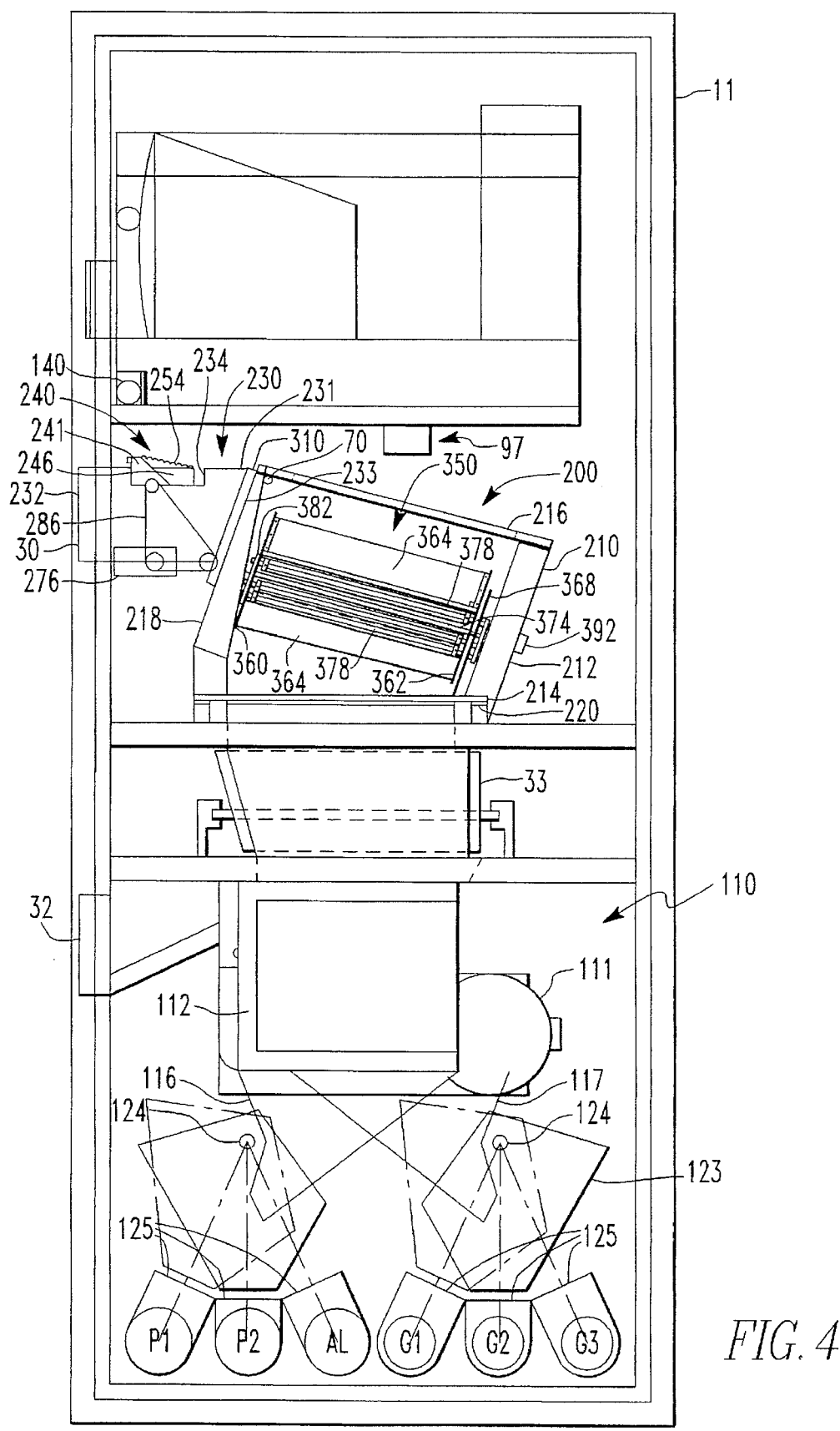
FIG. 4 is a side cutaway view of the housing of the commodity collection, densification and storage assembly of the present invention shown in FIG. 3.

Responsive to the second sensor device 70, the entire separation mechanism 350 is driven about the main axle 352 by the motor 372 in order to separate the various inserted commodities. The separation mechanism 350 separates the inserted commodities into a first group of commodities consisting of glass commodities and a second group of commodities consisting of plastic and aluminum commodities for insertion into the densification assembly A motor 322 is mounted to the base member 312 to drive the plates 320 between the first position and the second position. 110. As best shown in FIGS. 3 and 12, the separation mechanism 350 is rotatable about the main axle 352 in both a clockwise or counter clockwise direction. In FIGS. 3 and 12 the separation mechanism 350 is disposed 60° away from a resting position in which it would receive a commodity. The separation mechanism 352 rotates clockwise 120° responsive to the feature sensor device 70 determining that an inserted commodity in the top cradle is a glass commodity. Thus, the glass commodity is dumped out of the separation mechanism 350 along path C in FIG. 12 to the glass crusher 112.

Similarly, the separation mechanism 350 rotates counter clockwise 120° responsive to the feature sensor device 70 determining that the inserted commodity is a plastic or aluminum commodity, or is to be returned to the consumer via the reject port 32 as a nonparticipating commodity or a nonrecyclable commodity. If the feature sensor device 70 determines that the commodity is nonrecyclable or rejects it for any reason, a movable door 33 is placed in the dotted line position shown in FIGS. 3 and 12 to block the commodity from reaching the shredder 111. Thus, the commodity is routed to the reject port 32 along path B in FIG. 12. If the feature sensor device 70 determines that the commodity is plastic or aluminum, the door 33 is placed in the solid line position shown in FIGS. 3 and 12 to instead block the commodity from reaching the reject port 32. Thus, the commodity is routed to the shredder 111 along path A in FIG. 12.

In accordance with the invention, a densification means is provided for densifying the commodity. As broadly embodied herein, densification means comprises a densification assembly 110 including both a shredding mechanism 111 and a crushing mechanism 112. The shredding mechanism 111 densifies commodities of the second group, namely, the plastic and aluminum commodities received from the separation mechanism 350.

The shredding mechanism 111, generally depicted in FIG. 1, is generally well known and, as broadly embodied herein, may comprise the device disclosed in U.S. patent application Ser. Nos. 07/645,926 filed Jan. 25, 1991, or 08/150,830, filed Nov. 8, 1993, both of which are owned by Applicants' Assignee. Applicants hereby incorporate the description of the shredding mechanism disclosed in those applications herein by reference. Any other suitable densifying mechanisms may be utilized within the scope of the invention, such as crushers and comminuting devices similar to those disclosed in U.S. Pat. No. 4,784,251, also owned by Applicants' Assignee, the descriptions of which are incorporated by reference herein.

The crushing mechanism 112, also generally depicted in FIG. 1, is also well-known in the art and, as broadly embodied herein, may comprise the device disclosed in U.S. Pat. No. 4,573,641, owned by Applicants' Assignee, the description of which is also incorporated herein by reference. The crushing mechanism 112 densifies commodities of the first group consisting of glass commodities, and generally comprises two rotatable drums 113 which rotate in opposite directions so as to draw glass commodities into the small area between them for crushing. The crushing mechanism 112 may have a plurality of ridges 114 extending outwardly from the drums 113 to facilitate drawing the glass commodities into the area between the drums. The crushing mechanism 112 may also include drive rods 115 disposed above the drums 113 for forcing the glass commodities between the drums. Any suitable means for crushing glass commodities may be provided within the scope of the present invention. For example, the crushing mechanism may also comprise the device disclosed in U.S. patent application Ser. No. 08/119,395, filed Feb. 22, 1994, owned by Applicants' Assignee, and incorporated by reference herein.

In accordance with the invention, removal means are provided for removing the densified commodity from the densification means to the storage means. As broadly embodied in FIGS. 1 and 2, the removal means comprises a removal device 120 including a sorter assembly 121 for receiving the densified commodities and routing the densified commodities to the storage means 12 responsive to the second sensor device 70 so as to maintain separation of the densified commodities. After the densified commodities pass through the shredding mechanism 111, they fall into a shredded commodity ramp 116. Similarly, the crushed commodities fall from the crushing mechanism 112 into a crushed commodity ramp 117.

The sorter assembly 121 preferably includes first and second chutes 122, 123 for routing the densified commodities from the ramps 116, 117 to the proper place in the storage means 12. The first chute 122 receives shredded commodities from the shredded commodity ramp 116, and the second chute 123 receives crushed commodities from the crushed commodity ramp 117. Each of the first and second chutes 122, 123 is swingable about a pivot 124.

Preferably located adjacent the first and second chutes 122, 123 are a plurality of exit tubes 125, each of which is in communication with one of a plurality of inlet pipes 126 in communication with the storage means 12. The first and second chutes 122, 123 are moved pursuant to the second sensor device 70 so that the chutes empty into the inlet pipe 126 corresponding to the proper storage location in the storage means 12, thereby maintaining separation of the various densified commodities.

Alternately, the sorter assembly 121 may be replaced with the distribution assembly described in U.S. patent application Ser. No. 08/119,395, discussed above.

The storage means 12 preferably includes a segregated storage area for separately storing each predetermined type of densified commodity. In the embodiment illustrated in FIGS. 1 and 2, three storage bins 13, 14 and 15 are connected to the housing 11 by inlet pipes 126. Any reasonable number of storage bins can be attached to the housing 11 via inlet pipes depending on the amount of separation and number of densified commodities to be separated.

Figure 16:
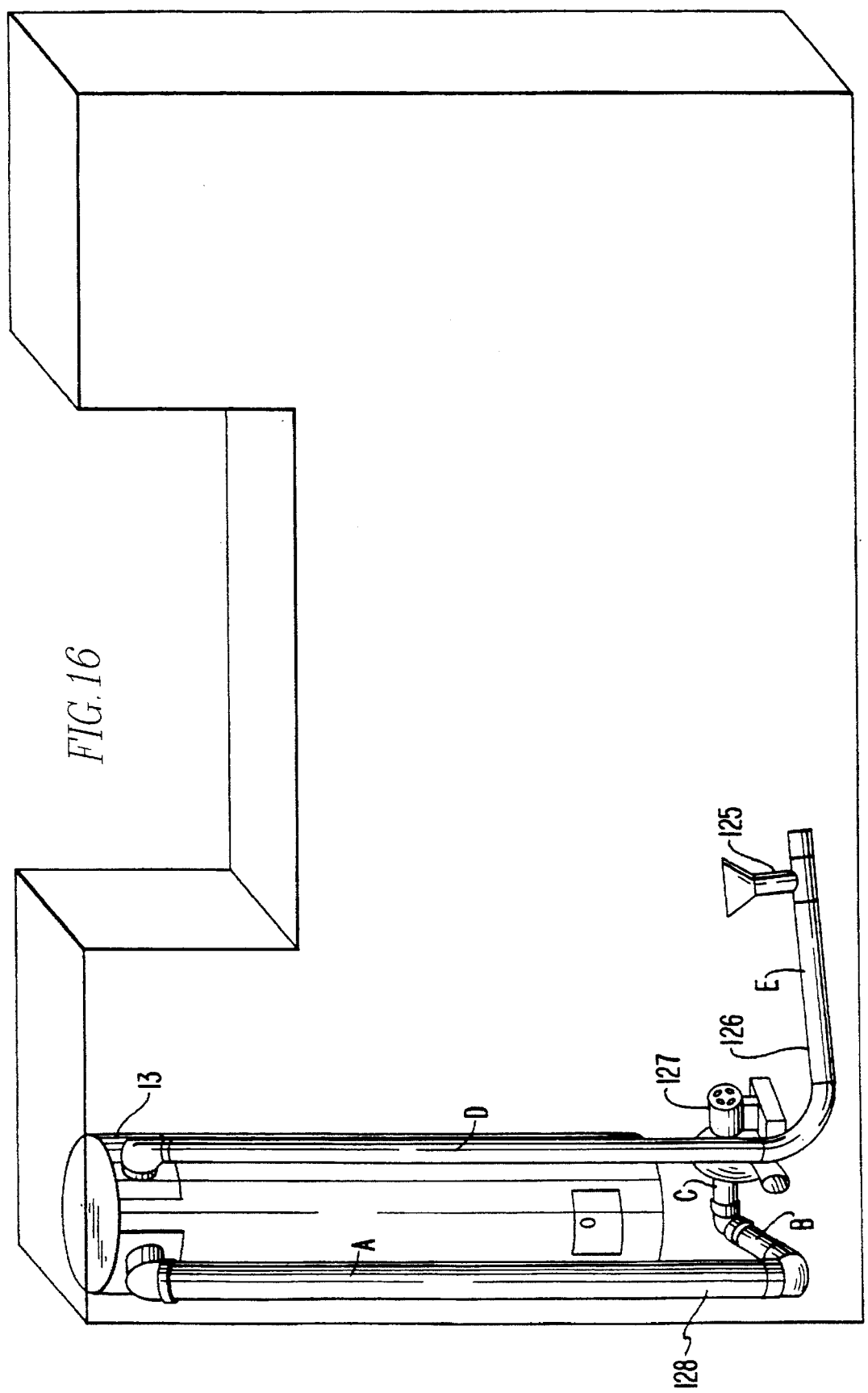
FIG. 16 is a perspective view of the removal means for removing densified cans to the storage means.

As shown in FIG. 16, the removal means preferably includes pneumatic means for removing the densified commodity to the storage means. The operation of such pneumatic means is disclosed in U.S. Pat. No. 5,226,219 owned by Applicants' Assignee, the description of which is incorporated herein by reference. As broadly embodied herein, and as shown in FIG. 16, the pneumatic removal means for removing aluminum commodities includes an inlet pipe 126 in communication with a storage bin. Densified commodities are deposited in the inlet pipe 126 through the exit tube 125 by the first chute 122. A blower 127 draws air from the bin through the outlet pipe 128, thereby sucking air and densified commodities through the inlet pipe 126 into the bin. Alternatively, the pneumatic means disclosed in copending application Ser. No. 08/148,620, filed Nov. 8, 1993, owned by Applicants' Assignee, the description of which is incorporated by reference, may be employed.

Each densified commodity is preferably stored in a separate storage bin or compartment, similar to the one described for receiving shredded metal commodities, each being in communication with the housing by one of the inlet pipes 126 and being attached to a blower 127 via an outlet pipe 128. One blower 127 may be operatively connected to a plurality or all of the storage bins, or a separate blower may be provided for each bin. Preferably, one blower 127 is provided in each housing 11 to reduce cost and required space, especially where a plurality of housings as provided in one location. The blower 127 may thus be placed in communication with each of the outlet pipes 128, and is placed in communication with the pipe corresponding to the commodity just densified responsive to the second sensing means 70.

Figure 17:
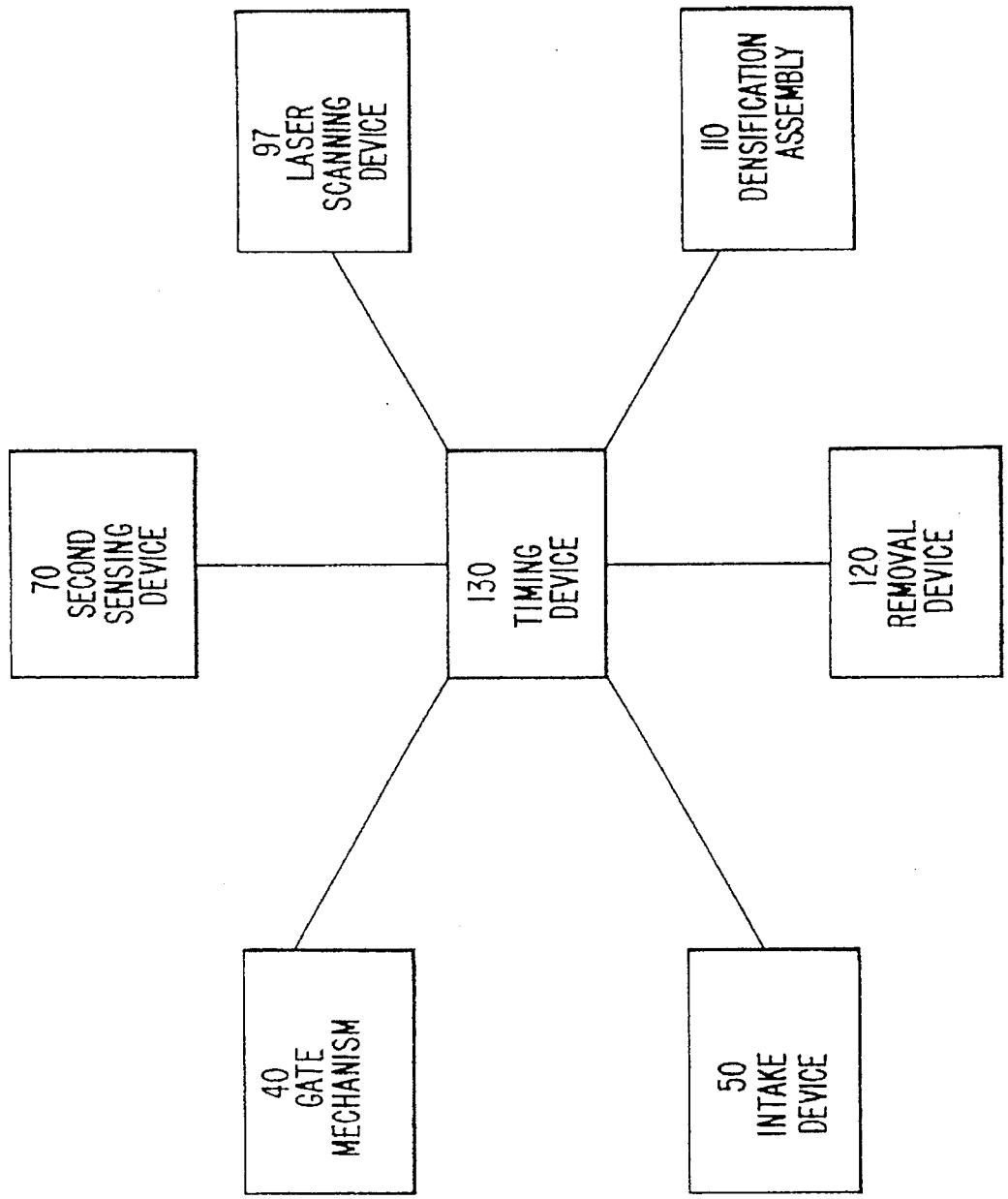
FIG. 17 is a block diagram generally depicting the timing means of the commodity collection, densification and storage assembly and its operational connection to the intake means, gate means, second sensor means, densification means and removal means.

In accordance with the invention, a timing means is provided for coordinating a sequential operation of the intake means, gate means, second sensor means, densification means and removal means so that the assembly may receive a plurality of various commodities while maintaining the separation of each type of inserted commodity. As broadly depicted in FIG. 17, the timing means comprises a timing device 130 including a microprocessor operatively connected to the container present sensor 300, insert tube assembly 230, iris device 310, feature sensor 70, densification assembly 110, and removal device 120. Further, the microprocessor which comprises the timing device 130 may also control the feature sensor 70 described above.

Since an object of the present invention is to allow rapid recycling of a number of types of commodities in succession, the timing device 130 controls the sequential activation of the above portions of the assembly to achieve a minimum preferred processing speed of 45 cans per minute, 14 glass bottles per minute, and 6 plastic bottles per minute. The maximum preferred amount of transition time required for the timing device 130 to adjust the assembly to process commodities of different compositions is 3 seconds.

The timing device 130 initiates the action of the insert tube assembly 230 to draw in a second commodity at a variable time after the drawing in of a first commodity based on the information obtained by the feature sensor 70 regarding the first inserted commodity. Each of the compositions of commodities take different amounts of time to be processed by the assembly due to their inherent differences in size, weight, shape, etc. The timing device 130 ensures that an inserted commodity has passed into the densification assembly 110 before the next commodity is drawn into the housing by the insert tube assembly 230. Further, the removal device 120 and the blower 127 must be properly activated to remove the densified commodities from the inlet pipes 126 to the storage means 12 to prevent clogging and mixture of different densified commodities in the first and second chutes 122, 123.

The timing device 130 enables more rapid utilization of the present invention. Densified commodities of different compositions and colors pass through the same path in the densification assembly 110, ramps 116, 117, and chutes 122, 123. Timing device 130 enables the assembly to operate quickly, while maintaining proper segregation of densified commodities. Thus, the use of the timing device allows the commodity collection, densification and storage assembly to simultaneously process several commodities thereby saving time for the consumer.

Preferably, a payment means is provided for determining the number of commodities inserted and issuing at least one token in response. As broadly embodied herein, payment means comprises a payment assembly 140 including a microprocessor 130 for counting the number of commodities inserted and calculating the value of the token to be issued to the consumer. The token may comprise a redeemable voucher, receipt or coin.

In order to reduce the need for maintaining a supply of coins or currency, it is preferred that a printer be utilized for printing and issuing redeemable receipts or vouchers in response to the commodities received. These receipts or vouchers may have barcodes and can be later exchanged for merchandise or cash, thereby eliminating the need for storing currency or coins in the machine. Printing mechanisms known in the art such as those made by Atech or Cybertech may be readily incorporated into the assembly.

The timing device 130 may also, pursuant to signals received from shut-off sensors (not shown), either partially or totally prevent the assembly from accepting recyclable commodities. For example, if a storage bin 13, 14, 15 were full or an inlet pipe 126 were blocked, the timing device 130 would, pursuant to the information obtained by the feature sensor device 70, refuse to accept any more of the corresponding type of recyclable commodity. The inserted commodity would be returned to the consumer through the reject port 32 as if it were a nonrecyclable commodity or a nonparticipating commodity.

The operation of the assembly shown in the figures will now be described. The consumer begins by approaching the housing 11 with various commodities to be inserted. The consumer first chooses the type of token to be issued as payment means by, for example, pressing a button corresponding to a voucher, coin, or receipt. The consumer then inserts the first commodity into the insert port 30 of the housing 11. Insertion of the commodity is detected by the container present sensor 300, thereby initiating the rotation of the rollers 250 and 272 of the insert tube assembly 230. The iris device 310 opens and closes as the insert commodity passes by, and the inserted commodity moves past the feature sensor 70 onto the separation mechanism 350. After the iris device 310 is released from the opened position, microprocessor 130 determines whether the plates 320 closed quickly enough (or closed at all). If not, the insert tube assembly 230 is stopped and the iris device 310 is reopened. If the object is removed from the iris device 310 allowing it to close, the insert tube assembly 230 will resume operation.

The feature sensor device 70 may then sense features of the commodity such as its color, composition, weight, and shape, and may scan the inserted commodity for a barcode, rotating the commodity if necessary.

The separation mechanism 350 and door 33, responsive to the information about the inserted commodity determined by the feature sensor device 70, route the inserted commodity accordingly. Commodities with unreadable bar codes or lacking bar codes, steel cans, and heavy objects may all be rejected, as determined by the program in the microprocessor 130, and returned to the consumer via the reject port 32. Plastic and aluminum commodities are sent to the shredding mechanism 111 for densification, and glass commodities are sent to the crushing mechanism 112 for densification. The densified commodities then pass down the ramps 116, 117 to the sorter assembly 121. First and second chutes 122, 123 transfer the densified commodities to the proper inlet pipe 126 to send the densified commodity to the storage means 12. When the densified commodity reaches the inlet pipe 126, the blower 127 is activated thereby transferring the densified commodity to the storage means 12.

Meanwhile, the consumer may push a button to receive payment for the inserted commodities, or the consumer may insert another commodity into the insert port 30.

Due to the speed of the present invention in receiving commodities, the above activities of the assembly may often overlap when a plurality of commodities are inserted consecutively. For example, when a second commodity is inserted, the insert tube assembly 230 will begin to draw the commodity into the housing 11 once the previously inserted commodity is passed to the densification assembly 110.

Other embodiments of the invention will be apparent to those skilled in the art from consideration of the specification and practice of the invention disclosed herein. It is intended that the specification be considered as exemplary only, with a true scope and spirit being indicated by the following claims.

What is claimed is:

1. An acceptance assembly for a commodity collection, densification, and storage device comprising:
    a frame;
    an insert tube disposed in the frame defining an inlet for receiving a commodity, and an outlet;
    a driven roller supported by the frame and disposed in the insert tube rotatable in a direction to contact and draw the commodity through the insert tube from the inlet through the outlet;
    a sensor disposed in the frame proximate the outlet for sensing a feature of the commodity; and
    an iris device disposed in the frame between the outlet and the sensor, the iris device having a base secured to the frame and defining an opening therethrough adjacent the outlet, and a plurality of plates swingably secured to the base, the plates being pivotable between a first position covering the opening and the outlet, and a second position uncovering the opening and the outlet, the iris device precluding access to the sensor via the inlet of the insert tube when the iris device is in the first position.

2. The acceptance assembly of claim 1, further including at least one idler roller supported by the frame and disposed in the insert tube opposite the driven roller cooperating with the driven roller to direct the commodity from the inlet through the outlet.

3. The acceptance assembly of claim 2, further including a support member swingably secured to the frame at one end and supporting the driven roller in the insert tube at the other end, the support member pivotable to allow the commodity to pass between the driven roller and the idler roller.

4. The acceptance assembly of claim 1, further including a container present sensor disposed adjacent the inlet of the insert tube for sensing the presence of a container in the inlet, the driven roller rotating and the iris device moving to the second position responsive to the container present sensor sensing a container in the inlet.

5. The acceptance assembly of claim 1, further including a motor operatively connected to at least one of the plates for moving the plates between the first and second positions.

6. The acceptance assembly of claim 5, further including a plurality of connector bars each pivotably secured to a respective pair of the plates so that the plates are moved in unison between the first and second positions by the motor.

7. The acceptance assembly of claim 1, wherein the sensed feature is a material of composition of the commodity.

8. The acceptance assembly of claim 1, wherein the sensed feature is a color of the commodity.

9. The acceptance assembly of claim 1, wherein the sensed feature is a weight of the commodity.

10. The acceptance assembly of claim 1, wherein the sensed feature is a barcode disposed on the commodity.

11. An acceptance assembly for a commodity collection, densification, and storage device comprising:

a frame;

an insert tube disposed in the frame defining an inlet for receiving a commodity and an outlet;

a sensor disposed in the frame proximate the outlet for sensing a feature of the commodity;

an iris device disposed in the frame between the outlet and the sensor, the iris device being pivotable between a first position covering the outlet and a second position uncovering the outlet; and a separation mechanism disposed in the frame for separating the commodity according to the sensed feature, the separation mechanism including a main axle, two end plates, and a plurality of dividers disposed between the end plates and extending substantially radially from the main axle, a pair of adjacent dividers defining a cradle therebetween, the end plates and dividers rotatably mounted to the main axle and rotating about the main axle to thereby place one of the cradles in position to receive the commodity after exiting the outlet.

12. The acceptance assembly of claim 11, wherein the separation mechanism includes at least three dividers defining three cradles spaced about the main axle.

13. The acceptance assembly of claim 11, wherein the main axle is rotatable relative to the end plates, and the separation mechanism further includes a central roller secured to the main axle, the central roller including an outer surface extending into each of the cradles and rotating the commodity in a given cradle to assist the sensor means in sensing a feature of the commodity.

14. The acceptance assembly of claim 13, wherein the separation mechanism further includes a plurality of side rollers each defining an outer surface, each side roller mounted in one of the dividers so that the outer surface extends into the two adjacent cradles, the side rollers rotating the same direction as the central roller to assist the sensor means in sensing a feature of the commodity.

15. The acceptance assembly of claim 14, wherein the separation mechanism further includes a central gear mounted for rotation with the central roller, a plurality of side gears, each mounted for rotation with one of the side rollers, and a plurality of transfer gears, each meshing with the central gear and one of the side gears so that the central rollers and the side rollers rotate in the same direction.

16. The acceptance assembly of claim 15, further including means for rotating the main axle to thereby rotate the central roller and the side rollers.

17. The acceptance assembly of claim 11, further including means for rotating the end plates and dividers about the main axle.

18. The acceptance assembly of claim 17, wherein the means for rotating the end plates and dividers about the main axle includes a drive gear mounted on one of the end plates, and a motor secured to the frame, the motor driving the gear in one of two directions according to the feature sensed by the sensor.

19. A method of accepting a commodity into a commodity collection, densification, and storage device having a frame, the method comprising:

inserting the commodity into an inlet of an insert tube disposed in the frame toward an outlet of the insert tube;

driving a roller supported by the frame and disposed in the insert tube in a direction to contact and draw the commodity through the insert tube from the inlet through the outlet;

moving an iris device from a first position to a second position to allow the commodity to pass through the outlet, the iris device including a base secured to the frame and defining an opening therethrough adjacent the outlet, and a plurality of plates swingably secured to the base, the plates being pivotable between the first position covering the opening and the outlet, and the second position uncovering the opening and the outlet, the iris device precluding access to the sensor via the inlet of the insert tube when the iris device is in the first position;

returning the iris to the first position; and sensing a feature of the commodity with a sensor disposed in the frame proximate the outlet.

* * * * *